United States Patent Office 3,746,673
Patented July 17, 1973

---

3,746,673
AZIRIDINYL ALKYL-ACRYLATE OR METH-ACRYLATE GRAFT COPOLYMERS
John A. Simms, Wilmington, Del., and Aloysius N. Walus, Flint, Mich., assignors to E. I. du Pont de Nemours and Company, Wilmington, Del.
No Drawing. Filed Dec. 22, 1970, Ser. No. 100,830
The portion of the term of the patent subsequent to Mar. 21, 1989, has been disclaimed
Int. Cl. C08f 45/34, 45/36
U.S. Cl. 260—22 CB   44 Claims

ABSTRACT OF THE DISCLOSURE

The graft copolymer consists essentially of a backbone segment of polymerized ethylenically unsaturated monomer units and side chain segments grafted into the backbone through an aziridinyl acrylate or methacrylate coupling unit. These graft copolymers are particularly useful in forming coating compositions which may be in the form of aqueous dispersions, organosols or lacquers and these compositions form useful finishes for trucks, automobiles, airplanes, appliances such as refrigerators, stoves, washing machines, and the like and can be used as primers and/or sealer compositions.

BACKGROUND OF THE INVENTION

This invention relates to graft copolymers and in particular to graft copolymers that utilize an aziridinyl compound as the grafting mechanism.

Graft copolymers are well known in the art as shown by Schmidle et al. in U.S. Pat. 3,232,903, issued Feb. 1, 1966, and Osmond et al. U.S. Pat. 3,317,635, issued May 2, 1967. These graft copolymers can be used in coatings but there is a need in the automobile, truck and appliance manufacturing industries today for high quality graft copolymers that can be formulated with conventional pigments and plasticizers and that will form finishes with excellent adhesion, outstanding durability and weatherability and excellent scratch chip and mar resistance.

Aziridinyl alkyl acrylates or methacrylates have been utilized in the preparation of copolymers as shown in Ashby et al. U.S. Pat. 3,480,601, issued Nov. 25, 1969. However, graft copolymers have not been prepared with these compounds. The novel graft copolymer of this invention utilizes aziridinyl alkyl acrylate or methacrylate as the coupling unit to prepare a high quality graft copolymer. The graft copolymer can be utilized in coating compositions which may be in the form of lacquers, organosols or aqueous dispersions useful for high quality finishes for trucks, automobiles, airplanes, appliances and the like.

SUMMARY OF THE INVENTION

The graft copolymer of this invention has a number average molecular weight of about 5,000–200,000 and consists essentially of a polymeric backbone segment and polymeric side chain segments; wherein (1) The polymeric backbone segment comprises 10–90% by weight of the graft copolymer and consists essentially of polymerized ethylenically unsaturated monomer units; and (2) The polymeric side chain segments correspondingly comprise 90–10% by weight of the graft copolymer and are grafted into the backbone segment through a coupling unit that is polymerized into the backbone that has the formula

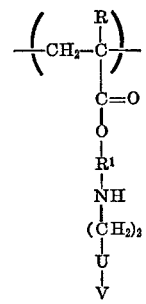

wherein R is either H or CH$_3$; R$^1$ is an alkylene group having 1–8 carbon atoms; U is a segment selected from the group consisting of

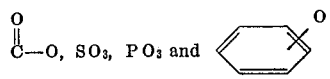

and V is a polymer segment having a number average molecular weight of about 1,000–150,000 and is either a polyepoxyester, alkyd resin, polyacrylic ester, polynitrile, polyamide, polyimide, polyamide/imide, polyurethane, polyester and polysiloxane or another vinyl addition polymer.

DESCRIPTION OF THE INVENTION

In the process for preparing the novel graft copolymer of this invention, a prepolymer is first formed which is the side chain segment of the graft copolymer. Conventional polymerization techniques are used to prepare the prepolymer and the resulting prepolymer has a number average molecular weight of about 500–150,000 and contains at least one reactive group having acid characteristics and that will yield a hydrogen ion in a subsequent reaction. The residual portion of this reactive group after the hydrogen is removed in the formation of the graft copolymer is represented by U in the above formula. The aziridinyl compound reacts with the reactive group of the prepolymers and the resulting product polymerizes with the backbone monomer units to form the graft copolymer. The aziridinyl compound is the coupling unit which couples the prepolymer to the backbone of the polymer. The resulting graft copolymer has a number average molecular weight of about 5,000–200,000; preferably, polymers are prepared that have a number average molecular weight of about 30,000–150,000.

The prepolymer is prepared by conventional polymerization techniques in which the monomer constituents are blended with the solvent and a polymerization catalyst and heated to about 50–200° C. for about 0.5–6 hours to form a prepolymer.

Typical solvents and diluents which are used to prepare this prepolymer for example, toluene, xylene, butylacetate, acetone, methyl isobutyl ketone, methyl ethyl ketone, butyl alcohol, hexane, Cellosolve, Cellosolve acetate and other aliphatic, cycloaliphatic and aromatic hydrocarbons, esters, ethers, ketones and alcohols.

About 0.1–4% by weight, based on the weight of the monomers used to prepare the prepolymer, of a polymerization catalyst is used in the preparation of the prepolymer. For the polymerization of ethylenically unsaturated monomers, typical catalysts are ditertiary butyl peroxide, cumene hydroperoxide, azo-bis-isobutyronitrile and the like. Typical esterification catalysts that can be used for alkyd resins, epoxy resins, polyesters are, for example, sulfonic acids, organo-tin compounds such as dibutyl tin dilaurate, dibutyl tin oxide; litharge, titanium complexes, aromatic ammonium hydroxide compounds, for example benzyltrimethylammonium hydroxide.

A large variety of prepolymers can be utilized to prepare the novel graft copolymers of this invention, such as acrylic polymers, epoxy ester resins, alkyd resins, other vinyl addition polymers such as polyethylene, polypropylene, polybutylene, polychloroprene, ethylene vinyl acetate, polyvinyl chloride, polyvinylidene chloride, polystyrene, copolymers of styrene, fluorocarbon polymers such as polytetrafluoroethylene; polyamides, polyimides, polyamide/imides, polynitriles, such as polyacrylonitrile or polymethacrylonitrile; chain-extended polyurethanes, polyesters, polysiloxanes and the like. It is important that the prepolymer contain at least one reactive group having acid characteristics and that will yield a hydrogen ion so that the prepolymer will react with the aziridinyl compound to form a prepolymer having an ethylenically unsaturated site which will polymerize with the backbone monomers to form the graft copolymer of this invention.

The following are typical reactive groups attached to the prepolymer that have these acid characteristics:

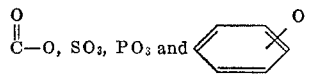

Typical substituents that can be used in the prepolymer to provide these groups are for example, α,β-unsaturated carboxylic acids, drying oil fatty acids, non-drying oil fatty acids, dicarboxylic aromatic, aliphatic or cycloaliphatic acids, sulfoalkyl methacrylates or acrylates, such as sulfoethyl methacrylate or acrylate, Bisphenol A, Bisphenol F, the reaction product of phosphoric acid and glycidyl methacrylate or acrylate and the like.

The technique that provides a high quality graft copolymer is to neutralize one of the reactive acid groups of the prepolymer with a basic compound and then react this prepolymer with the aziridinyl compound. The molar ratio of basic compound to acid equivalent of prepolymer to aziridinyl compound is maintained at 1:1:1. Typical basic compounds that can be used volatilize below 100° C. and are, for example, ammonia, ammonium hydroxide, primary amines, secondary amines, tertiary amines and polyamines, such as diethylamine, triethylamine, and the like.

In one preferred process for preparing the novel graft copolymer of this invention, one carboxylic group is utilized per prepolymer chain. The carboxyl group is neutralized with a basic compound, then reacted with the aziridinyl compound and then polymerized to form the graft copolymer. This technique leaves no residual acid in the resulting graft copolymer. This technique can be used when the prepolymer is prepared from ethylenically unsaturated monomers since a compound such as azo-cyanopentanoic acid can be used as a polymerization initiator and under selected reaction conditions so that each resulting prepolymer chain only contains one carboxyl group per chain.

The novel graft copolymer is prepared by blending the prepolymer which has been reacted with aziridinyl compound with the backbone monomer units and then polymerizing the ingredients preferably at about 75–260° C. for about 2–6 hours to form the graft copolymer. Any of the aforementioned polymerization catalysts utilized for ethylenically unsaturated monomers may be added along with additional solvents to prepare the graft copolymer.

Another closely related process that can be used to prepare the novel graft copolymer is to prepare a prepolymer according to the procedure indicated above that has only one reactive group per chain of prepolymer. The ethylenically unsaturated monomer units that form the backbone of the graft copolymer are polymerized with the aziridinyl compound to form a polymer segment having pendent aziridinyl groups. The aziridinyl group of the polymer segment are then reacted with the reactive group of the prepolymer to form the graft copolymer. Azocyanopentanoic acid can be used to prepare a prepolymer of ethylenically unsaturated monomers and provide a prepolymer with one reactive carboxyl group on the prepolymer chain. As indicated above, the carboxyl group on the prepolymer chain can be neutralized with a basic compound and then reacted with the aziridinyl group to form a high quality graft copolymer.

The ethylenically unsaturated monomer units utilized in the process to prepare the backbone of the novel graft copolymer are, for example, ethylene, propylene, butylene, ethylene vinyl acetate, vinyl chloride, vinylidene chloride, tetrafluoroethylene, fluorinated ethylene/propylene copolymer, styrene, styrene/butadiene, acrylonitrile, acrylamide, alkyl esters of acrylic and methacrylic acid in which the alkyl group has 1–24 carbon atoms and the like.

The aziridinyl compound utilized in this invention to form the novel graft copolymer has the formula

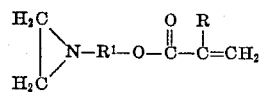

where R is H or CH$_3$ and R$^1$ is an alkylene group having 1–8 carbon atoms. Typical aziridinyl compounds of this type are aziridinyl alkyl acrylates or methacrylates, such as 2 - (1 - aziridinyl) ethyl acrylate, 3 - (1 - aziridinyl) propyl acrylate, 4 - (1 - aziridinyl) butyl acrylate, 6-(1-aziridinyl) hexyl acrylate, 8 - (1 - aziridinyl) octyl acrylate, 2 - (1 - aziridinyl) ethyl methacrylate, 3-(1-aziridinyl) propyl methacrylate, 4-(1-aziridinyl) butyl methacrylate, 6-(1-aziridinyl) hexyl methacrylate, 8-(1-aziridinyl) octyl methacrylate. One particularly preferred compound is 2-(1-aziridinyl)ethyl methacrylate since it forms copolymers of high quality.

The graft copolymers of this invention are used to prepare lacquer coating compositions. The lacquer coating composition comprises a solution of 10–50% by weight of a film-forming polymer dissolved in an organic solvent, in which the film-forming polymer has a number average molecular weight of about 20,000–200,000 and is the novel graft copolymer of this invention that has a soft polymeric backbone segment and hard polymer side chain segments, wherein—

The polymeric backbone segment comprises 10–50% by weight of the copolymer and consists essentially of soft polymerized monomer units which can be either an alkyl acrylate, an alkyl methacrylate or mixtures thereof, wherein the alkyl groups have 4–24 carbon atoms; and The polymer side chain segments comprise about 90–50% by weight of the copolymer and are grafted into the polymer backbone segment through a coupling unit of an aziridinyl compound that is polymerized into the backbone and that has the formula

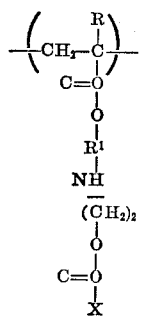

wherein R is either H or CH$_3$; R$^1$ is an alkylene group having 1-8 carbon atoms; X is a hard polymer segment that has a number average molecular weight of 5,000-150,000 and consists essentially of polymerized units selected from the group consisting of alkyl acrylate, alkyl methacrylate, acrylonitrile, methacrylonitrile or mixtures thereof wherein the alkyl groups have 1-3 carbon atoms.

Preferably graft copolymers are used in the lacquer composition that contain 15-25% by weight of backbone segment, and correspondingly, 85-75% of the side chain segment and have a molecular weight of about 30,000-130,000.

The lacquer preferably contains about 15-30% by weight of the novel graft copolymer dissolved in an organic solvent. This particular lacquer composition has excellent physical properties, such as increased solvent craze resistance, water spot resistance, resistance to deterioration from weathering, chip resistance, scratch and mar resistance, excellent gloss and buffability. These characteristics make the lacquer particularly suitable for high quality finish for automobiles and trucks.

One preferred process for preparing the novel graft copolymer utilized in the lacquer is to form a prepolymer that contains about 0.1-20% by weight of an $\alpha,\beta$-unsaturated carboxylic acid. The free carboxyl reacts with the aziridinyl group of the aziridinyl compound. The ethylenically unsaturated portion of the aziridinyl compound reacts with the backbone monomer units to form the graft copolymer. Preferably, one mole of the aziridinyl compound is used per mole of prepolymer to form a high quality graft copolymer. Generally, the graft copolymer contains residual unreacted carboxylic acids. The amount of residual acid may be about 0.1-5% by weight of the resulting graft copolymer polymer. Typically useful $\alpha,\beta$-ethylenically unsaturated carboxylic acids used to prepare this prepolymer are acrylic acid, methacrylic acid, crotonic acid, ethacrylic acid, itaconic acid and the like. Acrylic acid and methacrylic acid are preferred.

The above described technique that provides a high quality graft copolymer useful for lacquers is to neutralize one of the carboxyl groups of the prepolymer with a basic compound and then react this prepolymer with the aziridinyl compound. Also, it may be desirable to utilize only one carboxylic group per prepolymer chain, neutralize this carboxyl group with a basic compound and react this prepolymer with an aziridinyl compound to form the graft copolymer. This technique leaves no residual acid in the resulting graft copolymer and can be accomplished by using azocyanopentenoic acid for preparing the prepolymer.

Typical monomer units which are used in the novel process of this invention to form the hard prepolymer of the novel graft copolymer used for lacquers are alkyl acrylates and methacrylates in which the alkyl group has 1-3 carbon atoms, such as methyl methacrylate, propyl methacrylate, ethyl acrylate, propyl acrylate, acrylonitrile and methacrylonitrile. The monomers should be selected to provide the hard side chain segment preferably with a glass transition temperature of at least 60° C. and up to 110° C.

The following are typically useful soft constituents used to form the backbone of the novel graft copolymer used for lacquers: alkyl acrylates and alkyl methacrylates in which the alkyl group has 4-24 carbon atoms, preferably 4-12 carbon atoms, for example, butyl acrylate, hexyl acrylate, 2-ethylhexyl acrylate, nonyl acrylate, lauryl acrylate, stearyl acrylate, butyl methacrylate, isobutyl methacrylate, hexyl methacrylate, 2-ethylhexyl methacrylate, octyl methacrylate, nonyl methacrylate, lauryl methacrylate, stearyl methacrylate and the like. The monomers for the backbone segment should be selected to provide a soft backbone segment preferably with a glass transition temperature of 20° C. to as low as −100° C. Small amounts of any of the above monomers used for the side chain can be used in the backbone provided that the glass transition temperature remains within the above range.

The novel copolymers of this invention used to prepare lacquer compositions optionally can contain up to 20% by weight of the backbone segment of adhesion promoting acrylic monomers. Typical adhesion promoting monomers that can be used are aminohydroxy alkyl methacrylates and acrylates, such as aminohydroxy propyl methacrylate, aminohydroxy propyl acrylate, and the like; aminoalkyl methacrylates or acrylates, such as aminopropyl methacrylate, aminoethyl methacrylate, aminoethyl acrylate; ethylenically polymerizable oxazolidine compounds, such as 3 - (2-methacryloxyethyl)-2,2-spirocyclohexyl oxazolidine.

The graft copolymers of this invention can be used to prepare organosol coating compositions. The organosol coating compositions comprise 5-70% by weight of a film-forming polymer uniformly dispersed in an organic liquid in which the film-forming polymer has a number average molecular weight of about 20,000-200,000 and consists essentially of the novel graft copolymer that has a hard insoluble polymeric backbone segment and a soft soluble polymeric side chain segment; wherein (1) The polymeric backbone segment of the copolymer is insoluble in the organic liquid and has a glass transition temperature of at least 60° C. and comprises about 95-70% by weight of the copolymer and consists essentially of polymerized units selected from the following group: alkyl methacrylate, alkyl acrylate, acrylonitrile, methacrylonitrile, styrene, and mixtures thereof wherein the alkyl groups have 1-4 carbon atoms;

(2) The polymer side chain segments of the copolymer are soluble in the organic liquid and have a glass transition temperature below 20° C. and comprises 5-30% by weight of the copolymer and are grafted onto the backbone segment of the copolymer through aziridinyl coupling units that are polymerized into the backbone wherein the coupling unit has the formula

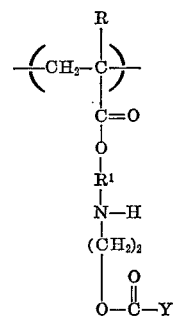

wherein R is either H or $CH_3$; $R^1$ is an alkylene group having 1-8 carbon atoms; Y is a polymer segment chemically different from the backbone segment and has a molecular weight of about 1000 to 15,000 and a glass transition temperature of less than 20° C. and consists essentially of polymerized units selected from the following group: an alkyl acrylate, alkyl methacrylate, or a mixture thereof having 2-24 carbon atoms in each of the alkyl groups;

The organic liquid comprises a solvent blend containing at least one non-solvent for the graft copolymer backbone segment and at least one solvent for the side chain segment of the copolymer.

Preferably, graft copolymers are used in the organosol composition that have a molecular weight of 30,000-100,000 and preferably, contains 80-92% by weight of the backbone segment and correspondingly, 20-8% by weight of side chain segments.

Preferably, the solids content of the organosol composition is 30–60% by weight. By utilizing an organosol composition, coatings can be applied which have a substantially higher polymer solids content and uniform and even coverage can be obtained with the use of only two coats whereas conventional coating compositions, such as lacquers and enamels, require three or more coats to cover the substrate. This has particular cost saving advantages in the automobile and truck manufacturing industry in the reduction of application coats and also have the added advantage of reduction of air pollution since less solvent is utilized in these organosol compositions. Also, non-aromatic solvents that are considered non-air polluting solvents can be utilized in this composition.

One preferred process for preparing the graft copolymer for organosol compositions is to form a prepolymer that contains about 1–30% by weight of an $\alpha,\beta$-unsaturated carboxylic acid. The free carboxyl of the prepolymer reacts with the aziridinyl group of the aziridinyl compound and forms a prepolymer with one site of ethylenically unsaturation. This ethylenically unsaturated site of the prepolymer reacts with the ethylenically unsaturated backbone monomer units to form the graft copolymer. Generally, the graft copolymer contains residual unreacted carboxylic acid. The amount of residual acid may be about 0.1–5% by weight, based on the weight of the graft copolymer. Typically useful $\alpha,\beta$-ethylenically unsaturated carboxylic acids used to prepare this prepolymer are acrylic acid, methacrylic acid, crotonic acid, ethacrylic acid, itaconic acid and the like. Acrylic acid and methacrylic acid are preferred.

The monomers selected for the prepolymer of the novel graft copolymer used in the above organosol should provide a prepolymer that is relatively soft and soluble in solvents and that has a glass transition temperature of below 20° C. and as low as −100° C. The alkyl acrylates and methacrylates which are used to form this prepolymer contain 2–24 carbon atoms in the alkyl group and preferably, 2–12 carbon atoms in the alkyl group are, for example, ethyl acrylate, propyl acrylate, butyl acrylate, hexyl acrylate, 2-ethylhexyl acrylate, lauryl acrylate, stearyl acrylate, ethyl methacrylate, propyl methacrylate, butyl methacrylate, isobutyl methacrylate, hexyl methacrylate, 2-ethylhexyl methacrylate, octyl methacrylate, nonyl methacrylate, lauryl methacrylate, stearyl methacrylate and the like. Up to about 25% by weight, based on the weight of the prepolymer, of methyl methacrylate can be used with the aforementioned monomers provided that the glass transition temperature of the side chain remains below 20° C.

The monomer selected for the backbone of the novel graft copolymer used in the above organosol should provide a hard backbone segment that is insoluble in many solvents and that has a glass transition temperature of at least 60° C. to about 100° C. Typical monomer units which are used to form the backbone of the novel graft copolymer are alkyl methacrylates, having 1–4 carbon atoms in the alkyl group, such as methyl methacrylate, propyl methacrylate, butyl methacrylate, acrylonitrile, methacrylonitrile, styrene and mixture thereof. Small amounts of the aforementioned monomers used for the side chain can be utilized in the backbone segment provided the glass transition temperature of the backbone segment does not decrease below 60° C. The backbone segment of the graft copolymer must be chemically different from the side chain segment to provide a graft copolymer with soluble side chain segments that can be formed into an organosol coating composition.

In the above graft copolymer used for an organosol, optionally, up to 20% by weight, based on the weight of the backbone of the graft copolymer, of any of the aforementioned acrylic adhesion promoting units can be added to the hard backbone segment provided that the glass transition temperature of the segment remains within the 60° C. to 110° C. range.

Generally, the novel graft copolymer is prepared by solution polymerization and the resulting graft copolymer solution is converted to an organosol by the addition of a non-solvent for the graft copolymer backbone segment. To form a stable organosol, the non-solvent for the backbone segment must dissolve the side chain segment or the resulting blend of non-solvent and solvent of the solution must dissolve the side chain segment. The graft copolymer particles in the organosol will be from about 0.1 micron to about 2 microns in diameter and will form an organosol that is stable for long periods of time. The organosol can be readily formed into a solution by the addition of proper solvents and the solution can be reversed to form a stable organosol by the addition of suitable nonsolvents.

It may be desirable to directly prepare an organosol in the polymerization process for forming the graft copolymer. This can readily be accomplished by the addition of a non-solvent for the graft copolymer backbone segment during the polymerization process. The resulting product will be an organosol.

Typical solvents for the graft copolymer that can be used in the polymerization process and in the final organosol composition are, for example, methylethyl ketone, methylisobutyl ketone, Cellosolve, methyl Cellosolve, Cellosolve acetate, butyl Cellosolve, butyl Cellosolve acetate, xylene, toluene, diacetone alcohol, ethylene glycol diacetate, butyl carbitol and other aromatic hydrocarbons, ketones, ethers and esters.

Typical non-solvents for the novel graft copolymer backbone but are solvents for the side chain are as follows: aliphatic hydrocarbon solvents, such as hexane, cyclohexane, mineral spirits, heptane, VM & P naphtha, "Isopar E"; aliphatic and cycloaliphatic alcohols having 1–8 carbon atoms, such as methanol, ethanol, propanol, isopropanol, butanol, isobutanol, pentanol, hexanol, cyclohexanol, octanol and the like and blends of the above.

The novel graft copolymers of this invention can be used to prepare aqueous coating compositions. The aqueous polymeric coating compositions comprise 5–50% by weight of a uniformly dispersed film-forming polymer in an aqueous liquid containing up to 45% by weight, based on the weight of the liquid, of a water miscible solvent for the polymer; wherein the film-forming polymer has a number average molecular weight of 20,000–200,000 and consists essentially of the novel graft copolymer having a backbone segment and a polymeric side chain segment wherein (1) The polymeric backbone segment of the polymer comprises 70–95% by weight, based on the weight of the copolymer, and consists essentially of polymerized monomer units of methyl methacrylate, butyl methacrylate, acrylonitrile and mixtures thereof;

(2) The polymeric side chain segments comprises 30–5% by weight of the copolymer and are grafted into the backbone segment of the copolymer through a coupling unit that is polymerized to the backbone that has the formula

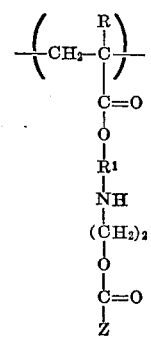

wherein R is either H or $CH_3$; $R^1$ is an alkylene group having 1–8 carbon atoms; Z is a polymer segment that has a number average molecular weight of 3,000–15,000 and consists essentially of 30–70% by weight, based on the weight of the polymeric side chain segment, of polymerized units of an α,β-ethylenically unsaturated carboxylic acid, and correspondingly, 70–30% by weight, based on the weight of the polymeric side chain segment, of polymerized units of alkyl acrylate, alkyl methacrylate, styrene, hydroxy alkyl acrylate, hydroxy alkyl methacrylate, and mixtures thereof, wherein the alkyl groups contain 1–3 carbon atoms.

Preferably, graft copolymers are utilized in the coating composition which have a molecular weight of 30,000–100,000 and contains 75–90% by weight of the backbone segment, and correspondingly, 25–10% by weight of the side chain segments. Preferably, the solids content of the aqueous composition is 30–60% by weight. By utilizing the dispersion, coatings can be applied which have a substantially higher polymer solids content than conventional lacquers and enamels and uniform and even coverage can be obtained with the use of only two coats which has not been possible with conventional solution type coating compositions. This has a cost saving advantage in the automobile and truck manufacturing industry and reduces air pollution to a substantial extent since very little or no solvent is used in the coating composition.

The prepolymer used to prepare the graft copolymer of this invention useful in dispersions contains about 30–70% by weight, based on the weight of the prepolymer, of polymerized units of an α,β-ethylenically unsaturated monovinylene carboxylic acid. Typically useful unsaturated monocarboxylic acids used to prepare this prepolymer are, for example, acrylic acid, methacrylic acid, crotonic acid, itaconic acid, ethylacrylic acid and the like. Acrylic acid and methacrylic acid are preferred.

Correspondingly, about 70–30% by weight, based on the weight of the prepolymer, is of polymerized units of alkyl acrylates, alkyl methacrylates, styrene, hydroxy alkyl acrylates or methacrylates, wherein the alkyl groups have 1–3 carbon atoms. Typical monomer units are, for example, methyl methacrylate, propyl methacrylate, ethyl acrylate, propyl acrylate, hydroxy ethyl methacrylate, hydroxy propyl methacrylate, and the like.

Typical monomer units used to form the backbone of the novel graft copolymer used in dispersions are methyl methacrylate, butyl methacrylate, acrylonitrile and mixtures of these monomers. Optionally, up to 15% by weight, based on the weight of the backbone of the graft copolymer, of acrylic adhesion promoting units can be added to the backbone segment. Typical adhesion promoting monomers are any of those mentioned above.

Acrylic-alkyd resin graft copolymers of this invention are useful for coating compositions. These coating compositions comprise a solution of 10–50% by weight of a film-forming polymer dissolved in an organic solvent, in which the film-forming polymer has a number average molecular weight of about 5,000–150,000 and is the novel graft copolymer having a polymeric backbone segment and a polymeric side chain segment; wherein (1) The polymeric backbone segment comprises about 40–90% by weight of the copolymer and is of polymerized monomer units which can be either an alkyl acrylate, alkyl methacrylate, styrene, acrylonitrile, methacrylonitrile or mixtures thereof, in which the aforementioned alkyl groups have 1–4 carbon atoms;

(2) The polymeric side chain segments comprise 10–60% by weight of the copolymer and are grafted into the polymer backbone segment through an aziridinyl coupling unit that is polymerized into the backbone that has the formula

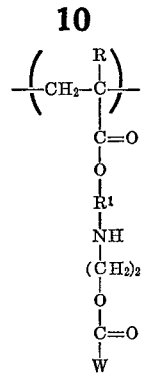

wherein R is either H or CH$_3$; R$^1$ is an alkylene group of 1–8 carbon atoms; and W is a polymer segment having a molecular weight of about 1,000–10,000 and consists essentially of an alkyd resin.

Preferably, graft copolymers are utilized in the above coating compositions that have a number average molecular weight of about 10,000–50,000 and that contain 60–80% by weight of the backbone segment and 20–40% by weight of the side chain segment.

The coating composition is a solution that contains preferably about 15–30% by weight of the novel film-forming graft copolymer and 0.1–20% by weight pigment. This particular composition has excellent physical properties without the use of an external plasticizer, such as good adhesion to bare metal substrates, chip resistance, crack and mare resistance and excellent weathering, and the composition can be used a primary coating for bare metal substrates or as a sealer composition. Sealer compositions are applied over a primed surface and provide a finish to which acrylic lacquers or enamel topcoats can be applied. Also, the composition can be used as a primary coating for trucks and automobiles and for appliances such as refrigerators, stoves, washers, dryers and the like. Moreover, the novel coating composition of this invention can be used in the repair of coatings of automobiles and trucks.

The alkyd resin prepolymer used to prepare the acrylic-alkyd resin graft copolymer of this invention basically consists of 10–60% by weight of a fatty acid which is either drying oil fatty acid or a non-drying oil fatty acid, 10–30% by weight of a polyhydric alcohol, and 10–30% by weight of a polycarboxylic acid or an anhydride of a polycarboxylic acid or a mixture of the acid and anhydride.

Typical drying oil fatty acids which are used to prepare the alkyd resin are tung oil fatty acids, linseed oil fatty acids, dehydrated castor oil fatty acids; soyabean oil fatty acids, tall oil fatty acids, and the like. Typical non-drying oil fatty acids which can be utilized are cottonseed oil fatty acids, peanut oil fatty acids, olive oil fatty acids, castor oil fatty acids and coconut oil fatty acids.

The polyhyric alcohol utilized in preparing the alkyd resin prepolymer can be a polyol containing 3–10 hydroxyl groups and having a molecular weight of about 90–1,000 or a diol or a blend of a polyol and a diol.

Typically useful polyols which can be used to form the alkyd resin are of the formula

wherein R$^2$ is either hydrogen, OH, or an alkyl group having 1–3 carbon atoms, and wherein $n$ and $m$ are integers and $n$ can be 2 to 4 and $m$ can be 0 to 2. Typical polyols of this type are trimethylol propane, trimethylol ethane, pentaerythritol, dipentaerythritol and glycerin.

Other polyols that can be used to form the alkyd resin are sorbitol, mannitol, α-methylglucoside and hexane triol. Resinous polyols can also be used such as a reaction product of styrene and allyl alcohol.

Diols can be utilized to form the alkyd resin of the general formula HO—$R^3$—OH, wherein $R^3$ is an aliphatic group or an alicyclic group. Typical diols that can be used are, for example, ethylene glycol, propylene glycol, diethylene glycol, dipropylene glycol, butane diol, pentane diol, decamethylene glycol, neopentyl glycol, 1,4-cyclohexane dimethanol.

The polycarboxylic acid constituent used to prepare the alkyd resin prepolymer can be any of the following aromatic dicarboxylic acids, aliphatic dicarboxylic acids, alicyclic dicarboxylic acids or the anhydrides of any of these acids: saturated aliphatic dicarboxylic acids, such as succinic, glutaric, adipic, pimelic, suberic, azelaic, brassic, dodecanedoic and the like; alicyclic dicarboxylic acids, such as hexahydroisophthalic acid, hexahydroterephthalic acid, tetrahydroisophthalic acid, tetrahydroterephthalic acid, hexahydrophthalic acid, tetrahydrophthalic acid; aromatic dicarboxylic acids, such as phthalic, isophthalic, terephthalic acid, and the like; naphthalene dicarboxylic acid; bibenzoic dicarboxylic acid; isopropylidene dibenzoic acid; methylene dibenzoic acid; hexafluoroisopropylidene dibenzoic acid; ketodibenzoic acid; oxydibenzoic acid; thiodibenzoic acid; sulfonedibenzoic acid.

Tricarboxylic acids or their anhydrides can also be used as a polycarboxylic acid constituent for the alkyd resin prepolymer such as trimellitic acid and trimellitic anhydride.

Up to 50% by weight of other monobasic acids can be utilized in preparing the alkyd resin prepolymer, such as benzoic acid, acetic acid, propionic acid, caproic acid, pelargonic acid, lauric acid, palmetic acid, stearic acid and the like.

The alkyd resin prepolymer, an aziridinyl compound and the acrylic monomeric units of the backbone are blended together with a solvent and a polymerization catalyst and reacted. The free acid of the alkyd resin prepolymer reacts with the aziridinyl group of the aziridinyl compound forming a prepolymer with one ethylenically unsaturated site. This prepolymer polymerizes with the backbone monomer units to form the graft copolymer.

Typical monomeric units which are used to form the backbone of the graft copolymer of this invention are alkyl acrylates and alkyl methacrylates having 1–4 carbons in the alkyl groups, such as methyl methacrylate, ethyl methacrylate, propyl methacrylate, butyl methacrylate, ethyl acrylate, propyl acrylate, butyl acrylate and the like. Acrylonitrile, methacrylonitrile and styrene can also be utilized. Optionally, up to 20% by weight based on the weight of the graft copolymer of acrylic adhesion promoting groups, can be added to the backbone segment. Typical adhesion promoting groups are any of those mentioned above.

Acrylic-epoxy ester graft copolymers of this invention are useful for coating compositions. These coating compositions comprise a solution of 10–50% by weight of a film-forming polymer that has a number average molecular weight of about 10,000–150,000 and is the novel graft copolymer of this invention having a polymeric backbone segment and polymeric side chain segments; wherein (1) The polymeric backbone segment comprises 10–90% by weight of the copolymer and is of polymerized monomer units which can either be an alkyl acrylate, an alkyl methacrylate, styrene or mixtures thereof, wherein the alkyl groups have 1–3 carbon atoms and the backbone segment can contain up to 50% by weight, based on the weight polymeric backbone segment, of polymerized acrylic monomers having adhesion promoting groups;

(2) The polymeric side chain segments comprise 90–10% by weight of the copolymer and are grafted into the backbone segment through a coupling unit that is polymerized into the backbone and has the formula

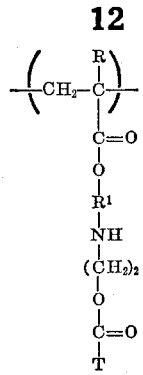

wherein R is either H or $CH_3$; $R^1$ is an alkylene group of 1–8 carbon atoms; and T is a polymer segment having a molecular weight of about 1,000–50,000 and consists essentially of polymerized epoxy ester units.

The above coating composition preferably contains about 15–30% by weight pigment. This particular composition has excellent physical properties, such as good adhesion to bare metal substrates, chip resistance, crack and mar resistance which makes the coating particularly suitable as a primer composition for bare metals or as a sealer composition. Sealer compositions are applied over a primed surface and provide a finish to which acrylic lacquer or enamel topcoats can be applied. Also, the composition can be used as a primary coating for appliances, such as refrigerators, stoves washers, dryers and the like.

The novel graft copolymer utilized in the coating composition is prepared by first forming an epoxy ester prepolymer containing reactive carboxyl groups which is a side chain segment of the graft copolymer by using conventional polymerization techniques for the preparation of epoxy ester polymers. This prepolymer, the backbone monomer units and units of an aziridinyl compound are polymerized to form the graft copolymer. The aziridinyl compound reacts with the carboxyl group of the prepolymers and the resulting product polymerizes with the backbone monomer units to form the graft copolymer. The aziridinyl compound is the coupling unit which couples the prepolymer to the backbone of the polymer. The resulting novel graft copolymer has a number average molecular weight of about 10,000–150,000, and preferably, 15,000–50,000; preferably graft copolymers are utilized that comprise 50–60% by weight of backbone segment and 60–40% by weight of side chain segments.

The prepolymer is prepared by conventional polymerization techniques in which an epoxy resin, a dicarboxylic acid or a mixture of an anhydride of a carboxylic acid and a dicarboxylic acid, one of the aforementioned solvents and about 0.1–4% by weight of an esterification catalyst are blended together and heated to about 120 to 200° C. for about 1–3 hours to form an epoxy ester prepolymer having a molecular weight of about 1,000–50,000 and preferably, 2,000–20,000.

The epoxy resins utilized in preparing the epoxy ester prepolymer have the repeating structural formula

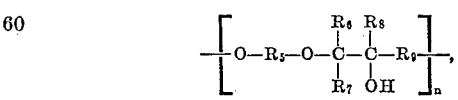

wherein $n$ is an integer sufficient to provide the epoxy resin with a molecular weight of at least about 500 and up to about 4,000, $R_5$ is a divalent aromatic radical; $R_6$, $R_7$ and $R_8$ are individually selected from the group of hydrogen and a $C_1$ to $C_5$ alkyl $R_9$ is a $C_1$ to $C_5$ alkylene group. $R_5$ as shown above, can be a Bisphenol A or a Bisphenol F, both of which can be substituted. Bisphenol A is para, para-isopropylidene diphenol and Bisphenol F is 4,4'-dihydroxydiphenyl methane. Suitable substituents for these compounds include $C_1$ to $C_5$ alkyls, halogens, such as chlorine, bromine and fluorine, and $C_1$ to $C_5$ alkoxy groups.

The preferred epoxy resin is the reaction product of epichlorohydrin and Bispehnol A which has the repeating structural formula

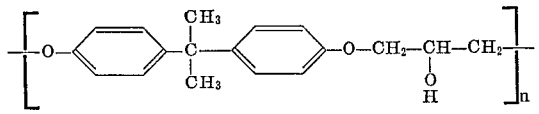

where *n* is the same as above. Epichlorohydrin and Bisphenol A polymer is preferred because it readily forms coatings which have a balance of desired physical properties, such as high tensile strength, excellent solvent resistance and excellent adhesion to substrates and to acrylic lacquers or enamel topcoats.

Another very useful epoxy resin is the reaction product of epichlorohydrin and Bisphenol F which has the repeating structural formula

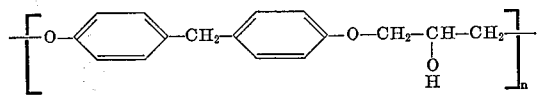

where *n* is as defined above.

Any of the aforementioned dicarboxylic acids used to prepare the alkyd resin can be used to prepare the epoxy ester prepolymer.

Up to 15% by weight monobasic acids can be utilized in preparing the epoxy ester prepolymer, such as benzoic acid, acetic acid, propionic acid, caproic acid, pelargonic acid, lauric acid, palmetic acid, stearic acid and the like. Also, drying oil fatty acids, such as tung oil, can also be utilized in preparing the epoxy ester prepolymer.

One method for preparing the novel graft copolymer is to form an epoxy ester prepolymer that contains about 0.1–20% by weight of a carboxylic acid. The free carboxyl reacts with the aziridinyl group of the aziridinyl compound. The ethylenically unsaturated portion of the aziridinyl compound reacts with the backbone monomer units to form the graft copolymer. Generally, the graft copolymer contains residual unreacted carboxylic acids. The amount of residual acid may be about 0.1–5% by weight of the resulting graft copolymer.

Typical monomer units which are used to form the backbone of the graft copolymer are styrene, alkyl acrylates or alkyl methacrylates having 1-3 carbon atoms in the alkyl group, such as methyl methacrylate, propyl methacrylate, ethyl acrylate, propyl acrylate and the like. Optionally, up to 10% by weight of the backbone segment of units of α,β-unsaturated carboxylic acid can be used such as, acrylic acid, methacrylic acid, crotonic acid, ethacrylic acid, itaconic acid and the like. Acrylic acid and methacrylic acid are preferred in amounts of 0.1–5% by weight of the backbone segment.

Up to 50% by weight, based on the weight of the backbone segment of the polymer, of acrylic monomers that have adhesion promoting groups and are described above can be utilized.

The following are examples of typical acrylic backbone monomers having adhesion promoting groups suitable for use in preparing these novel acrylic-epoxy ester graft copolymers: 97/3–99/1 methyl methacrylate/hydroxyaminopropyl methacrylate; 95/3/2 methyl methacrylate/methacrylic acid/3-amino-3-hydroxpropyl methacrylate; 50/50–99/1 methyl methacrylate/diethylaminoethyl methacrylate; 75/25–99/1 methyl methacrylate/2-aminopropyl methacrylate; 75/25–99/1 methyl methacrylate/2-aminoethyl methacrylate; 50/50–99/1 methyl methacrylate/2-(1 - aziridinyl) - ethyl methacrylate; 50/50–99/1 methyl methacrylate/t - butyl-aminoethyl methacrylate; 50/50–99/1 methyl methacrylate/dimethylaminoethyl methacrylate; 90/10–99/1 methyl methacrylate/N-2-hydroxypropylmethacrylamide; 90/10–99/1 methyl methacrylate/N-2-hydroxyethyl methacrylamide.

One particularly preferred adhesion promoting group is provided by a monomer having the formula

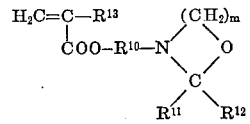

wherein *m* is an integer having a value of 2 to 3, $R^{13}$ is selected from hydrogen, methyl, ethyl. $R^{10}$ is selected from $C_1$ to $C_5$ alkylene groups, and $R^{11}$ and $R^{12}$ are selected from groups selected individually from (a) hydrogen, phenyl, benzyl and $C_1$ to $C_{12}$ alkyl groups in the case of $R^{11}$ and (b) hydrogen and $C_1$ to $C_4$ alkyl groups in the case of $R^{12}$, and (2) a single group selected from pentamethylene and tetramethylene which, together with the carbon atom to which the single group is attached, forms a carbocyclic group.

The aforementioned adhesion promoting monomer used in the novel graft copolymer of this invention is prepared according to the procedure described in the aforementioned U.S. Pat. 3,037,006. An especially preferred embodiment of this adhesion promoting monomer used in the backbone of the polymer of this invention is of the formula

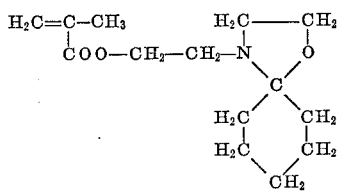

It will be apparent to those skilled in the art that this monomer can be referred to as (1) 3-(β-methacryloxyethyl) - 2,2 - pentamethylene-oxazolidine; (2) 3-(2-methacryloxyethyl) - 2,2 - spirocyclohexyl - oxazolidine; (3) MESO or (4) 1-oxa-4-(2'-methacryloxyethyl)-4-azaspiro [4.5]decane.

One particularly preferred acrylic backbone used to prepare these acrylic-epoxy ester graft copolymers contains about 80–90% by weight methyl methacrylate and about 1–20% by weight of 3-(2-methacryloxyethyl)-2,2-spirocyclohexyl oxazolidine.

Preferably, about 1–30% by weight, based on the weight of the film-forming constituents of a plasticizer, can also be used in the aforementioned coating compositions formed from the novel graft copolymers of this invention, such as butylbenzyl phthalate, dibutyl phthalate, triphenyl phosphate, 2-ethylhexylbenzyl phthalate, dicyclohexyl phthalate, dibenzyl phthalate, butylcyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyltributyl citrate, dibenzyl sebacate, tricresyl phosphate, toluene ethyl sulfonamide, the di-2-ethylhexylester of hexamethylene diphthalate, dimethylcyclohexyl) phthalate.

Other plasticizers which can be used are epoxidized soya bean oil, oil free and oil modified alkyds and polyesters, such as phthalate esters, polyalkylene adipate esters, or polyarylene adipate esters.

Pigments are used in the coating composition prepared from the novel graft copolymers of this invention in the amounts of 0.1–20.0% by weight, and preferably, about 0.3–6.0% by weight of pigment, is used. Preferably, the pigment is formed into a mill base using conventional techniques and then blended with the coating composition. Examples of the great variety of pigments which are used in these coating compositions are metallic oxides, preferably titanium dioxide, zinc oxide, and the like, metal hydroxides, metal flakes, metal powders, chromates, such as lead chromate, sulfides, sulfates, carbonates, carbon black, silica, talc, China clay, lead and iron blues, organic reds, maroons, organic dyes, lakes, etc.

Coating compositions of the novel graft copolymers prepared in this invention can be applied to a variety of substrates, for example, metal, wood, glass, plastics, such as polypropylene, styrene copolymers of styrene and the like, by any of the usual application methods, such as spraying, electrostatic spraying, dipping, brushing, flow coating, electrocoating and the like. Many of these coatings can be air dried, but preferably, are baked at about 110–200° C. for about 10–60 minutes. The resulting coating is about 1–5 mils thick, preferably 1–3 mils thick and can be rubbed or polished in accordance with conventional techniques, if desired, to improve smoothness or apparent gloss or both.

The novel graft copolymers of this invention can be used in electrocoating compositions if the acid number of the polymer exceeds about 5. The graft copolymer preferably is neutralized with a basic compound such as ammonia, potassium hydroxide or an amine and then dispersed in water to form an electrocoating composition that can be applied by standard electrocoating techniques.

The following examples illustrate this invention. The parts and percentages are by weight unless otherwise specified.

EXAMPLE 1

| | Parts by weight |
|---|---|
| Portion 1: | |
| Toluene | 1,167.0 |
| Methylethyl ketone | 254.0 |
| Methyl methacrylate monomer | 2,579.0 |
| Portion 2: | |
| Azocyano pentanoic acid [4,4'-azobis(4-cyano-pentanoic acid)] | 10.0 |
| Toluene | 204.0 |
| Portion 3: | |
| Azocyano pentanoic acid | 12.0 |
| Toluene | 175.0 |
| Portion 4: | |
| Azocyano pentanoic acid | 12.0 |
| Cellosolve | 175.0 |
| Portion 5: | |
| Azocyano pentanoic acid | 6.0 |
| Cellosolve | 87.0 |
| Portion 6: | |
| Azocyano pentanoic acid | 55 |
| Cellosolve | 88.0 |
| Portion 7: | |
| Xylene | 1,985.0 |
| Portion 8: | |
| Triethyl amine | 58.0 |
| Portion 9: | |
| 2-(1-aziridinyl) ethyl methacrylate | 87.5 |
| Butanol | 292.0 |
| Portion 10: | |
| Pelargonic acid | 35.0 |
| Portion 11: | |
| Acetone | 758.0 |
| Portion 12: | |
| 2-ethylhexyl acrylate | 753.0 |
| Azo-bis-isobutyronitrile | 7.5 |
| Portion 13: | |
| Azo-bis-isobutyronitrile | 4.4 |
| Portion 14: | |
| Azo-bis-isobutyronitrile | 3.0 |
| Portion 15: | |
| Toluene | 1,257.0 |
| Total | 10,014.9 |

Portion 1 is charged into a polymerization vessel equipped with a stirrer and reflux condenser and heated to about 85° C. Portion 2 is charged into a vessel and the batch is brought to its reflux temperature by an exothermic reaction and held at its reflux temperature for 15 minutes. Portion 3 is then added and the reaction mixture is held at its reflux temperature for 10 minutes. Portion 4 is then added and the reaction mixture is held at its reflux temperature for 10 minutes. Portion 5 is added and the reaction mixture is held at its reflux temperature for 10 minutes. Portion 6 is added and the reaction mixture is held at its reflux temperature for 2 hours. Portion 7 is then added and immediately after the addition of Portion 7, Portions 8 and 9 are added and the reaction mixture is heated to its reflux temperature and held at this temperature for 1 hour. Portion 10 is then added and the reaction mixture is held at its reflux temperature for an additional hour. Portion 11 is added and the temperature of the reaction mixture is reduced to about 90° C. Portion 12 is then added and the reaction mixture is heated to its reflux temperature and held at this temperature for 1½ hours. Portion 13 is then added and the reaction mixture is held at its reflux temperature for 30 minutes. Portion 14 is then added and the reaction mixture is held at its reflux temperature for 1½ hours. Portion 15 is added and the polymer solution is cooled to room temperature.

The resulting polymer solution has a polymer solids content of about 34%, the relative viscosity of the polymer is 1.330 measured at 0.5% polymer solids in an ethylene dichloride and the polymer has an acid number of 1.4. The polymer solution has a Gardner Holdt viscosity at 25° C. of Z.

Four coating compositions are formulated with the above prepared polymer solution using 0, 5, 10 and 20% by weight of a plasticizer. The plasticizer is an alkyd resin of coconut oil/ethylene glycol phthalate. Conventional solvents are used to dilute the compositions to a viscosity which can be applied by a doctor blade. Each of the above prepared coating compositions are applied to a steel substrate primed with a standard iron oxide alkyd primer composition. A doctor blade is used to apply a film which after baking at 150° C. for 30 minutes gives a film about 2 mils in thickness. The resulting films have excellent clarity, good gloss, and excellent water spot resistance and solvent crazing resistance.

EXAMPLE 2

| | Parts by weight |
|---|---|
| Portion 1: | |
| Cellosolve | 170.0 |
| Toluene | 250.0 |
| Butanol | 250.0 |
| Methyl methacrylate | 250.0 |
| Methacrylic acid | 15.0 |
| Portion 2: | |
| Methyl methacrylate | 150.0 |
| Methacrylic acid | 13.0 |
| Azo-bis-isobutyronitrile | 4.0 |
| Portion 3: | |
| Methyl methacrylate | 80.0 |
| Methacrylic acid | 12.0 |
| Azo-bis-isobutyronitrile | 2.0 |
| Portion 4: | |
| Azo-bis-isobutyronitrile | 1.0 |
| Portion 5: | |
| Azo-bis-isobutyronitrile | 1.0 |
| Portion 6: | |
| Triethylamine | 8.0 |
| Portion 7: | |
| 2(1-aziridinyl) ethyl methacrylate | 8.0 |
| Lauryl methacrylate | 120.0 |
| Methyl methacrylate | 152.0 |
| Portion 8: | |
| Acetone | 300.0 |
| Portion 9: | |
| Azo-bis-isobutyronitrile | 1.0 |

| Portion 10: | Parts by weight |
|---|---|
| Azo-bis-isobutyronitrile | 0.5 |
| Portion 11: | |
| Azo-bis-isobutyronitrile | 0.5 |
| Isopropyl alcohol | 220.0 |
| Ethylene imine | 18.0 |
| Portion 12: | |
| Azo-bis-isobutyronitrile | 0.5 |
| Total | 2026.5 |

Portion 1 is charged into a reaction vessel equipped with a stirrer and a reflux condenser and the reaction mixture is heated to its reflux temperature. Portion 2 is added over a 30-minute period while the reaction mixture is held at its reflux temperature. Portion 3 is slowly added over a 30-minute period while the reaction mixture is held at its reflux temperature, for 15 minutes. Portion 4 is added and the reaction mixture is held at its reflux temperature for 15 minutes. Portion 5 is added and the reaction mixture is held at its reflux temperature for 15 minutes. Portion 6 is added and Portion 7 is added immediately after Portion 6. The reaction mixture is held at its reflux temperature for about 1 hour. Portion 8 is added and the temperature is lowered to about 80° C. and Portion 9 is added immediately and the reaction mixture is held at its reflux temperature for an additional 2 hours. Portion 10 is added and the reaction mixture is held at its reflux temperature for ½ hour. Portion 11 is added and the reaction mixture is held at its reflux temperature for 45 minutes. Portion 12 is then added and the reaction mixture is held at the reflux temperature for an additional 20 minutes.

The resulting polymer solution has a total polymer solids of 37.6%, and a Gardner Holdt viscosity at 25° C. of W+⅓. The polymer has a relative viscosity of 1.178 measured at 0.5% polymer solids in ethylene dichloride at 25° C. and has an acid number of less than 1.

A 2 mil film is applied to a metal substrate primed with an iron oxide alkyd resin primer and baked for 30 minutes at 150° C. The resulting film has excellent clarity, good gloss, excellent water spot resistance, good cold crack resistance and good solvent craze resistance.

A film is applied over a steel sheet primed with a sheet metal alkyd dip primer and baked as above. The film has excellent adhesion over this primer, which is surprising since many coating compositions generally do not have good adhesion to these types of primers without the use of a special sealer coat.

The above prepared polymer solution is blended with about 5% by weight of a standard alkyl plasticizer of ethylene glycol/coconut oil/phthalic acid and is compatible with this plasticizer which indicates that this composition is useful as an exterior finish for automobiles and trucks. A film of this composition is applied over a steel sheet primed as above and baked for 30 minutes at 150° C. The resulting film has excellent physical properties similar to those listed for the above finish.

EXAMPLE 3

| Portion 1: | Parts by weight |
|---|---|
| Xylene | 200.0 |
| Toluene | 150.0 |
| Butanol | 180.0 |
| Portion 2: | |
| Methyl methacrylate | 450.0 |
| Methacrylic acid | 30.0 |
| Azo-bis-isobutyronitrile | 4.8 |
| Portion 3: | |
| Azo-bis-isobutyronitrile | 1.0 |
| Portion 4: | |
| Azo-bis-isobutyronitrile | 1.0 |
| Portion 5: | |
| Triethylamine | 6.0 |

| Portion 6: | Parts by weight |
|---|---|
| 2-(1-aziridinyl) ethyl methacrylate | 6.0 |
| 2-ethylhexyl acrylate | 114.0 |
| Portion 7: | |
| Acetone | 200.0 |
| Portion 8: | |
| Azo-bis-isobutyronitrile | 0.5 |
| Portion 9: | |
| Azo-bis-isobutyronitrile | 0.5 |
| Portion 10: | |
| Propyleneimine | 22.0 |
| Total | 1365.8 |

Portion 1 is charged into a polymerization vessel equipped with a stirred and a reflux condenser and heated to its reflux temperature. Portion 2 is charged into the reaction vessel over a 1-hour period and held for 15 minutes at its reflux temperature. Portion 3 is added and the reaction mixture is held at its reflux temperature for an aditional 15 minutes. Portion 4 is then added and the reaction mixture is held at its reflux temperature for an additional 30 minutes. Portion 5 is added and Portion 6 is added immediately after Portion 5. Portion 7 is added immediately after Portion 6 and the temperature reduces to 80° C. Portion 8 is then added immediately and the reaction mixture is heated to its reflux temperature and maintained at this temperature for 1½ hours. Portion 9 is then added and the reaction mixture is held at its reflux temperature for an additional hour. Portion 10 is then added and the reaction mixture is held at its reflux temperature for another hour.

The resulting polymer solution has a total polymer solids content of 45.0%, a Gardner Holdt viscosity at 25° C. of about Z and the polymer has a relative viscosity of 1.164 measured at 0.5% polymer solids in ethylene dichloride at 25° C. and has an acid number of about 1.0.

A mill base is prepared by blending the following ingredients:

| Portion 1: | Parts by weight |
|---|---|
| Polymer solution (prepared above) | 50 |
| Ethylene glycol diacetate | 21 |
| Cellosolve acetate | 15 |
| Xylene | 69 |
| Portion 2: | |
| Titanium dioxide pigment (Rutile pigment) | 347 |
| Xylene | 60 |
| Total | 562 |

Portion 1 is charged into a mixer and is thoroughly blended. Portion 2 is then added and the mixture is thoroughly blended for 30 minutes. The mixture is then charged into a conventional sand mill and ground to a 0.1 mil fineness.

A lacquer is prepared by blending the following ingredients:

| | Parts by weight |
|---|---|
| Mill base (prepared above) | 230 |
| Polymer solution (prepared above) | 130 |
| Xylene | 72 |
| Total | 432 |

The above lacquer is diluted to a spray viscosity using a conventional lacquer thinner and is sprayed onto a steel panel primed with a high pigment volume primer surfacer which has been sanded to a smooth surface. The panel is baked at 165° C. for about 30 minutes. The resulting coating is about 2.5 mils thick. The coating has an excellent gloss and appearance, excellent solvent resistance, particularly to gasoline, and has excellent water spot resistance and solvent craze resistance. This lacquer can be utilized as a topcoat for automobiles and trucks.

EXAMPLE 4

The following ingredients are charged into a reaction vessel equipped with a stirrer and a reflux condenser to form an epoxy ester prepolymer:

| Portion 1: | Parts by weight |
|---|---|
| Epoxy resin ("Epon" 1004) [1] | 1375.50 |
| Benzoic acid | 21.50 |
| Adipic acid | 103.00 |
| Lithium ricinoleate | 0.75 |
| Benzyltrimethyl ammonium hydroxide | 2.00 |
| Ethylene glycol mono-ethyl ether | 265.00 |
| Portion 2: | |
| Ethylene glycol mono-ethyl ether | 735.00 |
| Portion 3: | |
| Ethylene glycol mono-ethyl ether | 500.00 |
| Portion 4: | |
| Ethylene glycol mono-ethyl ether | 333.00 |
| Total | 3335.75 |

[1] "Epon" 1004 has the following structural formula:

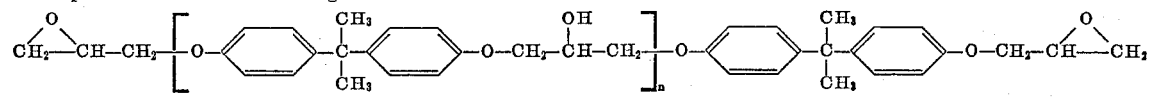

and has a Gardner Holdt viscosity measured at 40% by weight solution in butyl Carbitol at 25° C. of Q–U, and has an epoxy equivalent of 875–1025. The epoxy equivalent is the grams of resin containing 1-gram equivalent of epoxide.

Portion 1 is charged into a reaction vessel equipped with a stirrer and a reflux condenser and the ingredients are heated to the reflux temperature and are held at this temperature for about 2 hours. Portion 2 is then slowly added over a 10-minute period and the temperature of the reaction mixture is slowly reduced to room temperature. Portion 3 is then added and thoroughly blended and then Portion 4 is added. The resulting prepolymer solution has a polymer solids content of 45.4% and the solution has a Gardner Holdt viscosity measured at 25° C. of $Z_2$. The polymer has an acid number of 7.67.

A graft copolymer is prepared by reacting the following ingredients:

| Portion 1: | Parts by weight |
|---|---|
| Prepolymer polymer solution prepared above (45.4% solids) | 500.0 |
| Triethylamine | 5.0 |
| Portion 2: | |
| Butyl alcohol | 180.0 |
| Portion 3: | |
| 2-(1-aziridinyl) methyl methacrylate | 7.7 |
| Portion 4: | |
| Pelargonic acid | 2.7 |
| Portion 5: | |
| Acetone | 215.0 |
| Portion 6: | |
| MMA/MESO polymer blend [methyl methacrylate/3 - (2 - methacryloxyethyl)-2,2-spirocyclohexyl oxazolidine, weight ratio 85/15] | 210.1 |
| Tertiary butyl amino ethyl methacrylate | 4.5 |
| Azo-bis-isobutyronitrile | 2.0 |
| Portion 7: | |
| Azo-bis-isobutyronitrile | 0.8 |
| Portion 8: | |
| Azo-bis-isobutyronitrile | 0.3 |
| Total | 1128.1 |

Portion 1 is charged into a reaction vessel equipped with a stirrer and a reflux condenser and blended together. Portion 2 is then charged into the reaction vessel and blended with Portion 1. Portion 3 is then charged into the reaction vessel and the ingredients are heated to the reflux temperature which is about 120° C. and held at the reflux temperature for about 1 hour. Portion 4 is then added and the reaction mixture is refluxed for an additional hour. Portion 5 is then slowly added over a 10-minute period while maintaining the reaction mixture at its reflux temperature. Portion 6 is then added and the reaction mixture is maintained at its reflux temperature for about 1½ hours. Portion 7 is then added and the reaction mixture is maintained at its reflux temperature for an additional 45 minutes. Portion 8 is then added and the reaction mixture is refluxed for about 1 hour and ten minutes.

The resulting polymer has an acid number of 2.1 and a relative viscosity of 1.133 measured at 0.5% polymer solids in ethylene dichloride at 25° C. and the polymer solution has a total polymer solids content of 39.1% and a Gardner Holdt viscosity of about Y measured at 25° C.

A mill base is prepared as follows:

| | Parts by weight |
|---|---|
| Carbon black pigment | 0.70 |
| Titanium dioxide pigment | 120.13 |
| Aluminum silicate pigment | 19.91 |
| Polymer solution prepared above (39.1% polymer solids) | 21.05 |
| Solvent blend | 38.21 |
| Total | 100.00 |

The above ingredients are premixed and then charged into a conventional sand mill and ground in one pass to a 0.2 mil fineness.

The solvent blend utilized in the above mill base consists of 31% by weight methylethyl ketone, 24.1% by weight Cellosolve, 23.2% by weight isopropanol and 21.7% by weight toluene.

A sealer composition suitable for use in bonding an automotive acrylic lacquer to a pigmented alkyd primer composition is prepared as follows:

| | Parts by weight |
|---|---|
| High molecular weight epoxy resin (200,000 molecular weight of a polymer of epichlorohydrin and Bisphenol A) | 22.33 |
| Acrylic-graft copolymer epoxy resin solution (prepared above) | 23.78 |
| Diethylamine | 0.08 |
| Mill base (prepared above) | 14.44 |
| Solvent blend (described above) | 39.37 |
| Total | 100.00 |

These ingredients are charged into a mixer and agitated for 1 hour. The resulting composition has a total solids content of 27.2% by weight and a No. 2 Zahn cup viscosity of 24 seconds.

The composition is then reduced to a spray viscosity using the aforementioned solvent blend and a steel substrate coated with an alkyd primer composition pigmented with iron oxide is sprayed with the composition and air dried for 5 minutes, giving a sealer film of 0.25 mil in thickness. A coating of a standard automotive acrylic lacquer is then applied over the substrate using conventional spraying and baking procedures. The acrylic topcoat has excellent adhesion to the substrate and the composite has excellent chip resistance as measured by a gravelometer tester, excellent crack resistance and excellent adhesion to the substrate.

EXAMPLE 5

The following ingredients are charged into a reaction vessel equipped with a stirrer and a reflux condenser to form an epoxy ester prepolymer:

| Portion 1: | Parts by weight |
|---|---|
| "Empol" 1014 (dimer fatty acids) | 229.50 |
| Benzoic acids | 12.00 |
| "Epon" 1004 (described in Example 1) | 785.50 |
| Benzyl trimethyl ammonium hydroxide | 1.25 |
| Lithium ricinoleate | 0.50 |
| Dibutyl Carbitol | 177.00 |
| Methyl isoamyl ketone | 48.00 |
| Portion 2: | |
| Ethylene glycol monoethyl ether | 500.00 |
| Xylene | 275.00 |
| Total | 2028.75 |

Portion 1 is charged into a reaction vessel and the ingredients are heated to the reflux temperature and held at this temperature for about three hours. Portion 2 is then slowly added over a five minute period and the temperature of the reaction mixture is slowly reduced to room temperature. The resulting prepolymer solution has a polymer solids content of about 50% and has a Gardner Holdt viscosity measured at 25° C. of $Z_3$. The polymer has an acid number of about 7.0.

A graft copolymer is prepared by reacting the following ingredients:

| Portion 1: | Parts by weight |
|---|---|
| Prepolymer solution prepared above (50% solids) | 540.0 |
| Triethylamine | 6.0 |
| Butyl alcohol | 180.0 |
| Portion 2: | |
| 2-(1-aziridinyl) methyl methacrylate | 9.0 |
| Portion 3: | |
| Pelargonic acid | 3.6 |
| Portion 4: | |
| Acetone | 220.0 |
| Portion 5: | |
| Toluene | 224.0 |
| MESO/MMA polymer blend [3 - (2-methacryloxyethyl) 2,2 - spirocyclohexyl oxazolidine/methyl methacrylate copolymer, weight ratio 15/8] | 311.4 |
| t-Butyl-amino ethyl methacrylate | 6.0 |
| Azo-bis-isobutyronitrile | 3.0 |
| Portion 7: | |
| Azo-bis-isobutyronitrile | 1.2 |
| Portion 8: | |
| Azo-bis-isobutyronitrile | 0.6 |
| Portion 9: | |
| Azo-bis-isobutyronitrile | 0.6 |
| Total | 1505.4 |

Portion 1 is charged into a reaction vessel equipped with a stirrer and reflux condenser and the ingredients are blended together. The reaction vessel is then heated, then Portion 2 is charged into the reaction vessel and blended with Portion 1. Then the ingredients are heated to the reflux temperature, which is about 120° C. and held at this reflux temperature for about one hour. Portion 3 is added and the reaction mixture is refluxed for an additional hour. Portion 4 is then slowly added over a five-minute period and throughly blended with the reaction mixture. Portion 5 is added and Portion 6 is added and the reaction mixture is heated to its reflux temperature and held at this temperature for an additional hour. Portion 7 is added and the reaction mixture is held at its reflux temperature for an additional forty-five minutes. Portion 8 is added and the reaction mixture is refluxed for an additional forty-five minutes. Portion 9 is then added and the reaction mixture is refluxed for an additional hour.

The resulting polymer has an acid number of 1.6 and a relative viscosity of 1.157 measured at 0.5% polymer solids in ethylene dichloride at 25° C. The polymer solution has a total polymer solids content of 39.2% and the Gardner Holdt viscosity measured at 25° C. of about $Z_2$.

The above prepared polymer solution is reduced to a spray viscosity utilizing the solvent blend described in Example 1 and applied to a steel substrate primed with an alkyd resin pigmented with iron oxide and baked at 200° C. for thirty minutes. The resulting film is clear and has excellent adhesion to the substrate and forms an excellent finish.

A sealer composition suitable for use in bonding an automotive acrylic lacquer to a pigmented alkyd primer composition is prepared as follows:

| | Parts by weight |
|---|---|
| High molecular weight epoxy resin (200,000 molecular weight resin of a polymer of epichlorohydrin and Bisphenol A) | 22.33 |
| Graft copolymer solution (39.2% solids prepared above) | 23.78 |
| Diethylamine | 0.80 |
| Mill base composition (prepared in Example 1) | 14.44 |
| Solvent blend (described in Example 1) | 39.37 |
| Total | 100.72 |

These ingredients are charged into a mixer and agitated for one hour. The resulting composition has a total solids content of 27.2%, and a No. 2 Zahn cup viscosity of 24 seconds.

The composition is then reduced to a spray viscosity using the solvent blend (described in Example 1) and a steel substrate coated with an alkyd primer composition pigmented with iron oxide is sprayed with the composition and air dried for about 5 minutes, giving a film of about 0.25 mil in thickness. A coating of a standard automotive acrylic lacquer is then applied over the above coating using conventional procedures. The acrylic lacquer topcoat has excellent adhesion to the substrate. The composite of the primer, sealer coat and the acrylic topcoat has excellent chip resistance, as measured by a gravelometer test, excellent crack resistance and excellent adhesion to the substrate.

EXAMPLE 6

A prepolymer is prepared of methyl methacrylate/ acrylic acid in a weight ratio of 70/30 by charging the following ingredients into a conventional polymerization vessel equipped with a stirrer and a reflux condenser:

| Portion 1: | Parts by weight |
|---|---|
| Ethylene glycol mono-ethyl ether | 640 |
| Anhydrous isopropyl alcohol | 160 |
| Portion 2: | |
| Methyl methacrylate monomer | 560 |
| Acrylic acid monomer | 240 |
| Azo-bis-isobutyronitrile | 16 |
| Portion 3: | |
| Anhydrous isopropyl alcohol | 178 |
| Total | 1794 |

Portion 1 is charged into the reaction vessel and thoroughly blended and heated to the reflux temperature of the mixture which is about 110° C. Portion 2 is premixed and slowly added over a 2-hour period while maintaining the reaction mixture at its reflux temperature. The reaction mixture is maintained at its reflux temperature for an additional hour and Portion 3 is added, thoroughly mixed and the reactants are cooled to room temperature.

The resulting polymer solution has a total solids content of 45% and the polymer has an acid number of 229, a Gardner Holdt viscosity measured at 25° C. of Y. The polymer has a relative viscosity of 1.078 measured at 0.5% polymer solids in ethylene dichloride solvent at 25° C.

A graft copolymer dispersion is then prepared as follows:

| Portion 1: | Parts by weight |
|---|---|
| Prepolymer solution prepared above (45% polymer solids) | 356.0 |
| Anhydrous isopropyl alcohol | 504.0 |
| Deionized water | 150.0 |
| Portion 2: | |
| Triethyl amine | 50.0 |
| Portion 3: | |
| Methyl methacrylate monomer | 635.2 |
| 2-(1-aziridinyl)ethyl methacrylate | 4.8 |
| Portion 4: | |
| Azo-bis-isobutyronitrile | 3.0 |
| Portion 5: | |
| Triethyl amine | 17.0 |
| Portion 6: | |
| Azo-bis-isobutyronitrile | 2.0 |
| Portion 7: | |
| Deionized water | 800.0 |
| Portion 8: | |
| Deionized water | 710.0 |
| Total | 2522.0 |

Portion 1 is charged into a reaction vessel and thoroughly mixed, then Portion 2 is added. Portion 3 is premixed and added to the reaction vessel and the reaction mixture is heated to its reflux temperature of about 85° C. and held at its reflux temperature for about 1 hour. Portion 4 is then added and the reaction mixture is held at its reflux temperature for 30 minutes. Portion 5 is added and the reaction mixture is held at reflux for 30 minutes. Portion 6 is added and then Portion 7 is slowly added to the reaction mixture and the reaction mixture is held at its reflux temperature for about 45 minutes. Portion 8 is then slowly added over a 30-minute period and the reaction mixture is cooled to room temperature.

The resulting polymer dispersion has a polymer solids content of 24.9% and the polymer has an acid number of 45.2 and a relative viscosity measured at 25° C. of 1.393 measured at 0.5% polymer solids in ethylene dichloride at 25° C. The dispersion is stable for long periods of time.

A film of the dispersion is applied to a steel plate coated with a conventional alkyd primer and with a conventional sealer using a doctor blade and baked at 160° C. for 30 minutes. The resulting film was clear, tough and durable and had an excellent appearance.

EXAMPLE 7

A prepolymer is prepared by reacting the following ingredients:

| Portion 1: | Parts by weight |
|---|---|
| Ethylene glycol mono-ethyl ether | 750 |
| Anhydrous isopropyl alcohol | 750 |
| Portion 2: | |
| Methyl methacrylate monomer | 500 |
| Acrylic acid monomer | 500 |
| Azo-bis-isobutyronitrile | 20 |
| Total | 2520 |

Portion 1 is charged into a reaction vessel and heated to its reflux temperature which is about 95° C. Portion 2 is premixed and slowly added to the reaction vessel over a 2-hour period while the reaction is maintained at its reflux temperature. After Portion 2 is added, the reaction mixture is held at its reflux temperature for an additional hour. The resulting polymer has an acid number of 379, a relative viscosity of 1.6 measured at 0.5% polymer solids methylene dichloride at 25° C. The composition has a polymer solids content of 42% and a Gardner Holdt viscosity measured at 25° C. of U.

A graft copolymer dispersion is prepared as follows:

| Portion 1: | Parts by weight |
|---|---|
| Prepolymer solution prepared above (42% solids) | 100 |
| Ethylene glycol mono-ethyl ether | 256 |
| Anhydrous isopropyl alcohol | 200 |
| Deionized water | 200 |
| Portion 2: | |
| Triethyl amine | 28.0 |
| Anhydrous isopropyl alcohol | 56.0 |
| Portion 3: | |
| 2-(1-aziridinyl)ethyl methacrylate | 1.5 |
| Methyl methacrylate monomer | 208.5 |
| Portion 4: | |
| Methyl methacrylate monomer | 250 |
| Azo-bis-isobutyronitrile | 2.5 |
| Portion 5: | |
| Azo-bis-isobutyronitrile | 2.0 |
| Portion 6: | |
| Deionized water | 450.0 |
| Total | 1754.5 |

Portion 1 is premixed and charged into a reaction vessel equipped with a reflux condenser. Portion 2 is premixed and added to the reaction vessel with Portion 1 and thoroughly mixed. Portion 3 is premixed and added to the reaction vessel and the reaction mixture while being agitated is heated to its reflux temperature of about 85° C. and held at reflux for about 1 hour. Portion 4 is then premixed and added and the reaction mixture is held at its reflux temperature for an additional hour. Portion 5 is then added and then Portion 6 is slowly added over a 20-minute period while maintaining the reaction mixture at its reflux temperature. The reaction mixture is then cooled to room temperature.

The resulting polymer dispersion has a total solids content of 29% and has a Gardner Holdt viscosity at 25° C. of E. The polymer has an acid number of 29.5 and a relative viscosity of 1.173 measured at 0.5% polymer solids in dimethyl formamide at 25° C.

A film of the above prepared polymer solution is applied to a glass plate using a doctor blade, and the coating is baked for 30 minutes at 160° C. The resulting film is tough, durable and has an excellent appearance.

A mill base is prepared as follows:

| | Parts by weight |
|---|---|
| Water/solvent mixture (water/ethylene glycol monoethyl ether acetate/ethylene glycol monobutyl ether, weight ratio 1/1/3) | 26.9 |
| Plasticizer (benzyl texanol [1] phthalate) | 4.3 |
| Titanium dioxide pigment | 43.0 |
| Polymer dispersion (prepared above 29% solids) | 25.8 |
| Total | 100.0 |

[1] Texanol—2,2,4-trimethyl-1,3-pentane diol isobutyrate.

The above ingredients are premixed and then charged into a conventional sand mill and ground to 0.5 mil fineness. The resulting mill base has a pigment to binder ratio of 370/100.

A lacquer is prepared by blending the following ingredients:

| | Parts by weight |
|---|---|
| Polymer dispersion (prepared above) | 222.0 |
| Mill base (prepared above) | 86.0 |
| Benzyl texanol [1] phthalate plasticizer | 26.3 |
| Total | 334.3 |

[1] Texanol—2,2,4-trimethyl-1,3-pentane diol isobutyrate.

The lacquer is reduced to a spray viscosity of a No. 4 Ford cup by reducing the lacquer about 60% by volume with a solvent blend of ethylene glycol monobutyl ether/ ethylene glycol monoethyl ether acetate/acetone/water in a weight ratio of 17/9/17/31/26.

The resulting composition is sprayed onto a steel panel coated with a conventional alkyd primer and a sealer and baked for about 30 minutes at 160° C. The resulting coating has the following properties:

| | |
|---|---|
| 20 degrees/60 degrees gloss | 81/89. |
| Knoop hardness | 13.8. |
| Craze resistance to methylethyl ketone solvent | Yes. |
| Gasoline resistance | Excellent. |
| Total film build | 3.0 mils. |

EXAMPLE 8

A graft copolymer is prepared by reacting the following ingredients:

| Portion 1: | Parts by weight |
|---|---|
| Prepolymer solution in Example 1 (42% solids) | 100.0 |
| Ethylene glycol mono-ethyl ether | 206.0 |
| Anhydrous isopropyl alcohol | 170.0 |
| Isobutyl alcohol | 100.0 |
| Deionized water | 150.0 |
| Portion 2: | |
| Anhydrous isopropyl alcohol | 36.0 |
| Triethyl amine | 28.0 |
| Portion 3: | |
| 2-(1-aziridinyl)ethyl methacrylate | 1.5 |
| Butyl methacrylate | 75.0 |
| Methyl methacrylate monomer | 233.5 |
| Portion 4: | |
| Methyl methacrylate monomer | 50.0 |
| Azo-bis-isobutyronitrile | 1.0 |
| Portion 5: | |
| Methyl methacrylate monomer | 100.0 |
| Butyl alcohol | 100.0 |
| Portion 6: | |
| Azo-bis-isobutyronitrile | 0.5 |
| Portion 7: | |
| Azo-bis-isobutyronitrile | 0.5 |
| Portion 8: | |
| Deionized water | 900.0 |
| Total | 2252.0 |

Portion 1 is premixed and added to a polymerization vessel equipped with a reflux condenser and a stirrer. Portion 2 is premixed and added and the ingredients are thoroughly blended together. Portion 3 is premixed and added and the reaction mixture while being agitated is heated to its reflux temperature which is about 85° C. and held at its reflux temperature for about 1 hour and fifteen minutes. Portion 4 is then premixed and added to the reaction mixture which is held at its reflux temperature for an additional 30 minutes. Portion 5 is added and the reaction mixture is refluxed for an additional hour. Portion 6 is added and the reaction mixture is refluxed for 30 minutes. Portion 7 is added and Portion 8 is then slowly added over a 1 hour period.

A stable dispersion is formed which has a polymer solids content of 20.4% and the polymer has an acid number of 28.8 and a relative viscosity of 1.253 measured at 0.5% polymer solids in dimethyl formamide at 25° C.

A thin coating of the above prepared dispersion is applied with a doctor blade to a steel plate coated with a conventional primer and sealer and the coating is baked at about 116° C. for 30 minutes. The dried coating has an excellent appearance and is durable, tough and scratch resistant.

EXAMPLE 9

A graft copolymer is prepared by reacting the following ingredients:

| Portion 1: | Parts by weight |
|---|---|
| Prepolymer solution (prepared in Example 2) polymer solids content 42% | 150.0 |
| Ethylene glycol mono-ethyl ether | 341.0 |
| Anhydrous isopropyl alcohol | 253.0 |
| Ethylene glycol mono-butyl ether | 386.0 |
| Deionized water | 300.0 |
| Portion 2: | |
| Anhydrous isopropyl alcohol | 88.0 |
| Triethyl amine | 42.0 |
| Portion 3: | |
| 2-(1-aziridinyl) ethyl methacrylate | 2.0 |
| Methyl methacrylate monomer | 638.0 |
| Portion 4: | |
| Methyl methacrylate monomer | 250.0 |
| Azo-bis-isobutyronitrile | 4.0 |
| Portion 5: | |
| Methyl methacrylate monomer | 50.0 |
| Azo-bis-isobutyronitrile | 2.0 |
| Portion 6: | |
| Azo-bis-isobutyronitrile | 1.0 |
| Portion 7: | |
| Deionized water | 1300.0 |
| Total | 3807.0 |

Portion 1 is charged into a reaction vessel equipped with a stirrer and a reflux condenser and thoroughly mixed. Portion 2 is premixed and added to the reaction vessel. Portion 3 is premixed and added to the reaction vessel and the reaction mixture is heated to its reflux temperature and held at this temperature for about 1½ hours. Portion 4 is premixed and added to the reaction mixture which is heated to its reflux temperature and held at this temperature for 1 hour and 15 minutes. Portion 5 is premixed and added to the reaction mixture and held at its reflux temperature for an additional 30 minutes. Portion 6 is added and immediately thereafter Portion 7 is slowly added over a 40-minute period.

The resulting composition is a stable emulsion having a polymer solids content of 25.6%, the polymer has an acid number of 22.5 and a relative viscosity of 1.191 measured at 0.5% polymer solids in dimethyl formamide at 25° C.

A thin coating of the above prepared emulsion is applied to a steel substrate coated with a conventional primer and a sealer and the coating is baked for 30 minutes at about 160° C. The resulting coating has an excellent appearance and is scuff and abrasion resistant.

A water-reducible clear paint composition is formulated as follows:

| | Parts by weight |
|---|---|
| Acetone | 10.0 |
| Benzyl texanol phthalate plasticizer (described in Example 7) | 22.0 |
| Butyl benzyl phthalate | 2.0 |
| Butyl carbitol | 15.0 |
| Polymer dispersion prepared above (25.6% polymer solids) | 211.0 |
| Total | 260.0 |

The above ingredients are thoroughly blended to form a paint composition. This paint composition is reduced 100% by volume with a thinner of water/butyl carbitol in an 85/15 weight ratio. The diluted composition is sprayed onto a steel panel primed with a conventional alkyd primer pigmented with iron oxide and coated with a sealer and the coating is baked for 10 minutes at 95° C. and for 20 minutes at 165° C. The resulting coating has excellent mar and scratch resistance, excellent hardness, excellent gasoline resistance, a high craze-free temperature, a good appearance and good cold crack resistance.

EXAMPLE 10

| Portion 1: | Parts by weight |
|---|---|
| Linseed oil fatty acids | 1145.0 |
| Pentaerythritol | 466.0 |
| Phthalic acid | 420.0 |
| Dibutyl tin oxide | 0.7 |
| Xylene | 105.0 |
| Portion 2: | |
| Toluene | 187.0 |
| Portion 3: | |
| Phthalic anhydride | 106.0 |
| Portion 4: | |
| Toluene | 1041.0 |
| Total | 3470.7 |

Portion 1 is charged into a polymerization vessel equipped with reflux condenser and a stirrer. Portion 1 is heated to its reflux temperature and reacted until the acid number is less than 10. The time for this reaction is about 3 hours and the temperature is about 200 to 250° C. Portion 2 is then added and the temperature of the reaction mixture is cooled to 160° C. Portion 3 is then added and the reaction mixture is held at 150–160° C. for about ½ hour. Portion 4 is then added.

The resulting alkyd resin has an acid number of 24, the solution has a Gardner Holdt viscosity at 25° C. of about E and a polymer solids content of about 60.6%. The molecular weight of the polymer is about 4000.

A graft copolymer having the following constituents is then prepared:

| | Percent |
|---|---|
| Alkyd resin prepared above | 35.0 |
| 2-(1-aziridinyl) ethyl methacrylate | 1.4 |
| Methyl methacrylate | 27.0 |
| Butyl methacrylate | 32.0 |
| Tertiary butyl amino ethyl methacrylate | 4.6 |
| Total | 100.0 |

The following ingredients are reacted to form this polymer:

| Portion 1: | Parts by weight |
|---|---|
| Alkyd resin solution prepared above (60% polymer solids) | 350.0 |
| Toluene | 244.0 |
| Butanol | 70.0 |
| Portion 2: | |
| Triethylamine | 9.0 |
| Portion 3: | |
| N-butylmercaptane | 6.0 |
| Portion 4: | |
| 2-(1-aziridinyl) ethyl methacrylate | 8.4 |
| Methyl methacrylate | 162.0 |
| Butyl methacrylate | 192.0 |
| Tertiary butylaminoethyl methacrylate | 27.6 |
| Portion 5: | |
| Acetone | 131.0 |
| Portion 6: | |
| Azobisisobutyronitrile | 3.0 |
| Portion 7: | |
| Azobisisobutyronitrile | 1.5 |
| Portion 8: | |
| Azobisisobutyrontrile | 1.0 |
| Portion 9: | |
| Azobisisobutyronitrile | 1.0 |
| Portion 10: | |
| Azobisisobutyronitrile | 1.0 |
| Total | 1207.5 |

Portion 1 is charged into a reaction vessel equipped with a stirrer and a reflux condenser and thoroughly mixed. Portion 2 is charged into the reaction vessel and mixed. Portion 3 is charged into the reaction vessel and mixed. Portion 4 is charged into the reaction vessel, thoroughly mixed, and the reaction mixture is heated to its reflux temperature of about 110° C. and held at this temperature for about 1 hour. Portion 5 is charged into the reaction vessel which cools the reaction mixture to about 90° C. Portion 6 is charged into the reaction vessel, and the reaction mixture is held at about 88° C. for 45 minutes. Portion 7 is charged into the reaction vessel and the reaction mixture is held at about 88° C. for about 45 minutes. Portion 8 is then charged into the reaction vessel an the reaction mixture is held at about 88° C. for 45 minutes. Portion 9 is charged into the reaction vessel and the reaction mixture is held at about 880° C. for about 45 minutes. Portion 10 is then charged into the reaction mixture and the temperature of the reaction mixture is held at about 88° C. for an additional 45 minutes.

The resulting solution has a Gardner Holdt viscosity at 25° C. of about H, and a polymer solids content of about 49%. The polymer has an acid number of about 3.8 and a relative viscosity of 1.071 measured at 0.5% polymer solids in toluene/butanol solvent at 25° C.

A clear film is formed from the solution by brushing the solution on a glass plate and drying the coating at room temperature for about 2 hours.

A pigment dispersion is prepared as follows:

Formula 1 pigment dispersion

| | Parts by weight |
|---|---|
| Titanium dioxide pigment (sulfate process) | 630.0 |
| Soya glycerol phthalate alkyd resin solution (55% resin solids in which the alkyd resin is of 43% soya oil, 52% glycerol phthalate, 5% glycerin) | 158.0 |
| Xylene | 212.0 |
| | 1000.0 |

The ingredients are premixed and charged into a conventional sand-grinding mill and ground to about a 0.3 mil fineness.

A paint composition is formed by mixing the following ingredients:

| Portion 1: | Parts by weight |
|---|---|
| Formula 1 pigment dispersion (63% titanium dioxide dispersed in the soya oil alkyd resin and hydrocarbon solvent) | 188.02 |
| Soya glycerol phthalate alkyd resin solution (55% resin solids, alkyd described in Formula 1 pigment dispersion) | 26.10 |
| Alkyd-acrylic graft copolymers solution prepared above (49% polymer solids) | 439.49 |
| Cobalt naphthanate drier solution (6% cobalt in a hydrocarbon solvent) | 2.68 |
| Manganese naphthanate drier solution (6% manganese in a hydrocarbon solvent) | 0.28 |
| Lead tallate drier solution (24% lead in a hydrocarbon solvent) | 2.68 |
| Hydrocarbon solvent (boiling point 189–219° C., aniline point 28° C.) | 34.43 |
| Naphtha solvent (boiling point 100–163° C.) | 79.56 |
| Portion 2: | |
| Hydrocarbon solvent (boiling point 150–190° C., aniline point −28° C.) | 79.12 |
| | 852.36 |

Portion 1 is mixed for about 1 hour and then Portion 2 is added.

The above paint composition was reduced to a spray viscosity using an aromatic hydrocarbon solvent. A coating of about 2 mils thick of the paint composition was sprayed onto each of the following sets of panels: autobody steel panels which had been primed with pigmented alkyd primer; steel panels coated with an acrylic lacquer; steel panels coated with a pigmented epoxy primer; steel panels coated with a thermosetting acrylic enamel; steel panels coated with an alkyd enamel; steel panels coated with an alkyd melamine enamel. Several of the thermosetting acrylic enamel panels and the alkyd enamel panels and the alkyd melamine panels are sanded and the other panels are unsanded before the paint composition is applied. The paint is allowed to air dry for about 30 minutes and in each case, a tough, durable film having excellent gloss, adhesion and appearance is formed.

Several panels of each of the above sets are air dried for one week and are subjected to a high-humidity-low temperature crack test which consists of 4 cycles. In each cycle, the panels are subject to (1) 100% relative humidity and 100° F. for 24 hours, (2) −10° F. for 24 hours and (3) room temperature for 4 hours. At the completion of each cycle, the panels are examined with a magnifying glass for cracks. At the end of the test, the above panels showed no cracking or dulling and no loss in adhesion to the substrate.

Several panels of each of the above sets are exposed in Florida at a 45° angle facing south. The panels are examined after 4 and 8 months. After 8 months of weathering, each of the panels showed good color retention, excellent gloss, very little chalking and water spotting, and no loss of adhesion to the substrate.

The above tests indicate that the novel paint composition of this invention is an excellent coating for metals and adheres to most types of substrates even under severe conditions.

EXAMPLE 11

A polyester prepolymer is prepared having the following constituents:

| | Percent |
|---|---|
| Coconut oil | 50 |
| Ester of phthalic acid and glycerin | 47 |
| Excess phthalic anhydride | 3 |
| Total | 100 |

The polyester is prepared as follow:

| Portion 1: | Parts by weight |
|---|---|
| Coconut oil | 1000.0 |
| Glycerin | 301.0 |
| Dibutyl thin oxide | 2.0 |
| Portion 2: | |
| Phthalic anhydride | 787.0 |
| Portion 3: | |
| Xylene | 105.0 |
| Portion 4: | |
| Toluene | 1228.0 |
| Total | 3423.0 |

Portion 1 is charged into a polymerization vessel equipped with a stirrer and a reflux condenser. Portion 1 is heated to about 232° C. and held at this temperature for 45 minutes. Portions 2 and 3 are charged into the reaction vessel and the reaction mixture is heated to a reflux temperature of about 205–245° C. and held at this temperature for about 4 hours until an acid number of 40 is obtained. Portion 4 is then charged into the reaction mixture and the mixture is cooled to room temperature.

The resulting polymer has an acid number of 37.6, a Gardner Holdt viscosity of A, and the solution has a total solids polymer content of 57.5%.

A graft copolymer is then prepared having the following constituents:

| | Percent |
|---|---|
| Alkyd resin (prepared above) | 15.0 |
| 2-(1-aziridinyl) ethyl methacrylate | 1.2 |
| Methyl methacrylate | 81.0 |
| Acrylonitrile | 2.8 |
| Total | 100.0 |

This polymer is prepared as follows:

| Portion 1: | Parts by weight |
|---|---|
| Alkyd resin solution (prepared above) | 158.0 |
| Xylene | 80.0 |
| Butanol | 50.0 |
| Cellosolve acetate | 150.0 |
| Portion 2: | |
| Triethylamine | 8.0 |
| Portion 3: | |
| 2-(1-aziridinyl) ethyl methacrylate | 7.2 |
| Methyl methacrylate | 486.0 |
| Acrylonitrile | 16.8 |
| Portion 4: | |
| Actone | 135.0 |
| Portion 5: | |
| Azobisisobutyronitrile | 2.0 |
| Portion 6: | |
| Azobisisobutyronitrile | 1.0 |
| Portion 7: | |
| Azobisisobutyronitrile | 1.0 |
| Portion 8: | |
| V. M. & P Naphtha | 285.0 |
| Mineral spirits | 129.0 |
| Isopropyl alcohol | 70.0 |
| Portion 9: | |
| Glycol diacetate | 200.0 |
| Methylethyl ketone | 125.0 |
| Portion 10: | |
| Methylethyl ketone | 200.0 |
| Portion 11: | |
| Cellosolve acetate | 200.0 |
| Portion 12: | |
| Methylisobutyl ketone | 100.0 |
| Total | 2404.0 |

Portion 1 is charged into a reaction vessel equipped with a stirrer and reflux condenser and thoroughly mixed. Portion 2 is charged into the reaction vessel and thoroughly mixed. Portion 3 is then charged into the reaction vessel, thoroughly mixed and the reaction mixture is heated to its reflux temperature of about 218° C. for about 1½ hours. Portion 4 is then added and the reaction mixture is cooled to about 85° C. Portion 5 is added and the reaction mixture is held at about 85° C. for about 1 hour. Portion 6 is then added and the reaction mixture is held at 85° C. for 1 hour. Portion 7 is added and the reaction mixture is held at 85° C. for 1 hour. Portions 8, 9, 10, 11 and 12 are then added and thoroughly mixed.

The resulting polymer has an acid number of 2.6 and a relative viscosity of 1.30. The polymer solution has a total solids content of about 22.9% and a Gardner Holdt viscosity of O.

A clear film is formed from the polymer solution by brushing the solution on a glass plate and allowing the coating to air-dry at room temperature for about 2 hours. The coating has excellent gasoline resistance.

The polymer solution is compatible with plasticizers conventionally used in auto finishes and the air-drying and the baking qualities of the polymer make it particularly useful as a refinish composition. For example, the polymer is baked for about 30 minutes at 150° C. and forms a tough durable film. The polymer can be used as an internal plasticizer for conventional acrylic lacquers, and a variety of oil-modified plasticizers can be used with this polymer to formulate high-quality acrylic lacquer compositions.

EXAMPLE 12

The following polyester prepolymer is prepared: phthalic anhydride/pentaerythritol/benzoic acid/pelargonic acid in a molar ratio of 6/5/4/3.

The composition is prepared as follows:

| Portion 1: | Parts by weight |
|---|---|
| Pelargonic acid | 399.0 |
| Benzoic acid | 411.0 |
| Phthalic anhydride | 527.0 |
| Pentaterythritol | 610.0 |
| Dibutyl tin oxide | 0.8 |
| Diisobutyl ketone | 94.0 |
| Portion 2: | |
| Xylene | 403.0 |
| Portion 3: | |
| Phthalic anhydride | 220.0 |
| Portion 4: | |
| Xylene | 809.0 |
| Total | 3473.8 |

Portion 1 is charged into a reaction vessel equipped with a stirrer and reflux condenser and heated to about a temperature of 170–225° C. for about 5 hours to form a polymer. Portion 2 is charged into the reaction vessel, and the temperature of the reaction mixture is cooled to about 150° C. Portion 3 is added and the reaction mixture is held at 150° C. for about 30 minutes. Portion 4 is then added.

The following graft copolymer is prepared:

| | Percent |
|---|---|
| Polyester prepolymer (prepared above) | 40.0 |
| 2-(1-aziridinyl) ethyl methacrylate | 2.0 |
| Methyl methacrylate | 27.0 |
| Butyl methacrylate | 27.0 |
| Hydroxyethyl acrylate | 3.8 |

The polymers prepared by reacting the following ingredients:

| Portion 1: | Parts of weight |
|---|---|
| Alkyd resin solution (prepared above) | 334.0 |
| Xylene | 201.0 |
| Butanol | 100.0 |
| Cellosolve | 250.0 |
| Portion 2: | |
| Triethylamine | 12.0 |
| Portion 3: | |
| 2-(1-aziridinyl) ethyl methacrylate | 11.0 |
| Methyl methacrylate | 135.0 |
| Butyl methacrylate | 135.0 |
| Portion 4: | |
| Methylisobutyl ketone | 170.0 |
| Portion 5: | |
| Acetone | 243.0 |
| Portion 6: | |
| Hydroxyethyl methacrylate | 119.0 |
| Portion 7: | |
| Azobisisobutyronitrile | 2.0 |
| Portion 8: | |
| Azobisisobutyronitrile | 1.0 |
| Portion 9: | |
| Azobisisobutyronitrile | 0.5 |
| Portion 10: | |
| Azobisisobutyronitrile | 0.5 |
| Total | 1714.0 |

Portion 1 is charged into a reaction vessel with a stirrer and reflux condenser and thoroughly mixed. Portion 2 is charged into the reaction and mixed. Portion 3 is charged into the reactor and the reaction mixture is heated to its reflux temperature from about 120° C. for about 1 hour. Portions 4 and 5 are then charged into the reaction vessel, and the temperature of the reaction mixture is cooled to about 85° C. Portions 6 and 7 are then added, and the temperature of the reaction mixture is maintained at about 85° C. for about one hour. Portion 8 is added and the temperature of the reaction mixture is maintained at about 85° C. for about one hour. Portion 9 is added and the temperature of the reaction mixture is held at 85° C. for about one hour. Portion 10 is added and the reaction mixture is maintained at 85° C. for an additional hour.

The resulting polymer has an acid number of 11.8 and a theoretical relative viscosity of 1.179. The polymer solution has a Gardner Holdt viscosity of 25° C. of A and a total polymer solids content of 27.9%.

The polymer solution is diluted to a spray viscosity using conventional solvents and sprayed onto a steel panel and baked at 150° C. for 30 minutes. A clear coating is formed that is tough, durable and resistant to gasoline and ketone solvents.

This copolymer is compatible with thermosetting acrylic enamels containing melamine formaldehyde resins. This copolymer provides good metallic appearance when substituted for cellulose acetate butyrate in acrylic lacquers.

EXAMPLE 13

| Portion 1: | Parts by weight |
|---|---|
| Xylol | 622.0 |
| Butanol | 70.0 |
| Isopropyl alcohol | 60.0 |
| Portion 2: | |
| Lauryl methacrylate | 600.0 |
| Methacrylic acid | 100.0 |
| Xylene | 215.0 |
| Isopropanol | 35.0 |
| Azo-bis-isobutyronitrile | 10.0 |
| Portion 3: | |
| Lauryl methacrylate | 216.6 |
| Methacrylic acid | 83.4 |
| Cellosolve | 100.0 |
| Azo-bis-isobutyronitrile | 5.0 |
| Portion 4: | |
| Xylene | 100.0 |
| Butanol | 20.0 |
| Azo-bis-isobuyronitrile | 5.0 |
| Portion 5: | |
| Azo-bis-isobutyronitrile | 2.0 |
| Total | 2244.0 |

Portion 1 is charged into a polymerization vessel equipped with a reflux condenser and a stirrer. The solvent is heated to its reflux temperature which is about 105° C. While maintaining the reaction mixture at its reflux temperature, Portion 2 is slowly charged over a 30-minute period. Portion 3 is then slowly charged over a 30-minute period, while maintaining the reaction mixture at its reflux temperature. Portion 4 is divided into 5 equal parts and charged into the reaction mixture at 5-minute intervals. The reaction mixture is held at its reflux temperature for about 1 hour and then Portion 5 is charged into the reaction mixture and the mixture is held at its reflux temperature for an additional 15 minutes.

The resulting prepolymer is of lauryl methacrylate and methacrylic acid in a weight ratio of about 82/18. The polymer has an acid number of 117, and the polymer has a relative viscosity of 1.04 measured at 0.5% polymer solids in ethylene dichloride solvent at 25° C. The solution has a polymer solids content of 43.3% and a Gardner Holdt viscosity at 25° C. of Q.

An organosol of a graft copolymer then is prepared according to the following procedure by polymerizing in solution and precipitating to form an organosol by the addition of an aliphatic hydrocarbon solvent and alcohol mixture.

Portion 1:                                            Parts by weight
  Prepolymer solution prepared above (43.3%
    polymer solids) _____ 167.00
  Xylene _____ 170.00
  Butanol _____ 50.00
  Cellosolve _____ 55.00
  Hydroquinone _____ 0.03
  Triethylamine _____ 3.00
Portion 2:
  2-(1-aziridinyl)ethyl methacrylate _____ 2.40
  Methyl methacrylate _____ 498.00
  Acrylonitrile _____ 27.60
Portion 3:
  Acetone _____ 152.00
Portion 4:
  Azobisisobutyronitrile _____ 1.50
Portion 5:
  Azobisisobutyronitrile _____ 1.00
Portion 6:
  Azobisisobutyronitrile _____ 1.00
Portion 7:
  Azobisisobutyronitrile _____ 2.00
Portion 8:
  Aliphatic hydrocarbon solvent V.M. and P-
    naphtha solvent _____ 603.00
  Butanol _____ 120.00
                                               _____
    Total _____ 1853.53

Portion 1 is charged into a polymerization equipped with a reflux condenser and stirrer and thoroughly mixed. Portion 2 is premixed and charged into the polymerization vessel. The reaction mixture is heated to its reflux temperature, and is held at its reflux temperature for 1½ hours. Portion 3 is charged into the reaction vessel and the temperature is cooled to about 82° C. Portion 4 is then added and the reaction mixture is heated to its reflux temperature and held at this temperature for 1½ hours. Portion 5 is added and the reaction mixture is held at reflux for an additional hour. Portion 6 is added and the reaction mixture is held at the reflux temperature for 45 minutes and Portion 7 is then added and also held for 45 minutes. Portion 8 is premixed and added while the reaction mixture is being mixed. Portion 8 converts the reaction mixture from a solution to an organosol.

The resulting organosol has a total solids content of 31.1% and a Gardner Holdt viscosity at 25° C. of D. The polymer of the organosol has an acid number of 12.3 and a relative viscosity of 1.199 measured at 0.5% polymer solids in an ethylene dichloride at 25° C.

An organosol lacquer composition is then formulated from the above prepared organosol:

Portion 1:                                            Parts by weight
  Organosol prepared above (32% polymer
    solids) _____ 238
Portion 2:
  Plasticizer (prepared from adipic acid, neopentyl
    glycol and benzoic acid 60% polymer solids
    in toluene) _____ 40
  Ethylene glycol diacetate/Cellosolve acetate ___ 12
Portion 3:
  Solvent blend cyclohexane/ethylene glycol di-
    acetate/Cellosolve acetate (weight ratio
    40/30/30) _____ 124
                                                 ____
    Total _____ 414

Portion 2 is premixed and added to Portion 1 in a mixing vessel and then Portion 3 is added to Portions 1 and 2 and the blend is thoroughly mixed. The film is then sprayed onto a metal panel suitably primed and also to a glass panel. The films are baked for 30 minutes at 150° C. The film thickness is about 2 mils. The resulting film has excellent clarity, a Knoop hardness of 12.5 and has good gasoline resistance.

EXAMPLE 14

In the example, an organosol is prepared directly in the polymerization process:

Portion 1:                                            Parts by weight
  Copolymer of lauryl methacrylate/meth-
    acrylic acid, weight ratio about 82/18
    (43.3% polymer solids, prepared in Ex-
    ample 1) _____ 167.00
  Aliphatic hydrocarbon solvent _____ 200.00
  Butanol _____ 102.00
  Hydroquinone _____ 0.03
  Triethylamine _____ 3.00
Portion 2:
  2-(1-aziridinyl)ethyl methacrylate _____ 2.40
  Methyl methacrylate _____ 498.00
  Acrylonitrile _____ 27.60
  Cyclohexane _____ 200.00
Portion 3:
  Azobisisobutyronitrile _____ 1.50
Portion 4:
  Azobisisobutyronitrile _____ 1.00
Portion 5:
  Azobisisobutyronitrile _____ 1.00
Portion 6:
  Azobisisobutyronitrile _____ 1.00
Portion 7:
  Azobisisobutyronitrile _____ 2.00
                                               _____
    Total _____ 1206.53

Portion 1 is charged into a polymerization vessel equipped with a stirrer and a reflux condenser. Portion 2 is then charged into the reaction vessel and the reaction mixture is heated to its reflux temperature and held at this temperature for 1½ hours. Portion 3 is then added and the temperature is lowered to about 82° C. Portion 4 is then added and the reaction mixture is heated to its reflux temperature and held at this temperature for 1½ hours. Portion 5 is then added and the reaction mixture is held at its reflux temperature for an additional hour. Portion 6 is then added and the reaction mixture is held at its reflux temperature for an additional 45 minutes. Portion 7 is then added and the reaction mixture is held at its reflux temperature for an additional 45 minutes.

The resulting organosol dispersion has a milky white appearance and a total solids content of 51.0% and the polymer has an acid number of 12.4 and a relative viscosity of 1.287 measured at 0.5% polymer solids in ethylene dichloride at 25° C.

An organosol lacquer composition is prepared as in Example 1 using the identical solvents, except the above prepared organosol is substituted for the organosol used in Example 1. The resulting lacquer has the same physical properties as the organosol of Example 1. Films are formed on primed metal panels and on glass panels as in Example 1 and have properties which are similar to those of the lacquer films of Example 1.

EXAMPLE 15

Portion 1:                                            Parts by weight
  Copolymer solution (prepared in Exam-
    ple 1) _____ 167.00
  Xylene _____ 200.00
  Butanol _____ 102.00
  Hydroquinone _____ 0.03
  Triethylamine _____ 3.00
Portion 2:
  2-(1-aziridinyl)ethyl methacrylate _____ 2.40
  Methacrylonitrile _____ 525.60
Portion 3:
  Cyclohexane _____ 135.00
Portion 4:
  Azobisisobutyronitrile _____ 1.50
Portion 5:
  Azobisisobutyronitrile _____ 4.00
                                               _____
    Total _____ 1140.35

Portion 1 is charged into a reaction vessel equipped with a stirrer and reflux condenser and thoroughly mixed. Portion 2 is then added and the reaction mixture is heated to its reflux temperature and held at this temperature for 1½ hours. Portion 3 is then added and the temperature of the reaction mixture is reduced to 77° C. Portion 4 is then added and held at its reflux temperature for 1½ hours. Portion 5 is divided into four equal parts and added at 1 hour intervals while maintaining the reaction mixture at its reflux temperature.

The resulting organosol dispersion has a milky white appearance and a total polymer solids of 52.5%. The polymer has an acid number of 12.2 and a relative viscosity of 2.220 measured at 0.5% polymer solids in dimethyl formamide at 25° C. The dispersion was dissolved in dimethyl formamide and a film was cast on a metal substrate and baked for 30 minutes at 150° C. A tough solvent resistant film resulted which can be used as an exterior coating on automobiles and trucks.

EXAMPLE 16

A prepolymer is prepared by reacting the following ingredients:

| | Parts by weight |
|---|---|
| Portion 1: | |
| Xylene | 1100 |
| Butanol | 193 |
| Portion 2: | |
| Lauryl methacrylate | 500 |
| 2-ethylhexylacrylate | 640 |
| Methacrylic acid | 300 |
| Tertiary butyl peracetate solution (75% solids solution in mineral spirits) | 20 |
| Portion 3: | |
| Lauryl methacrylate | 260 |
| 2-ethylhexylacrylate | 160 |
| Methacrylic acid | 140 |
| Tertiary butyl peracetate solution (described above) | 20 |
| Portion 4: | |
| Butanol | 302 |
| Portion 5: | |
| Xylene | 365 |
| Total | 4000 |

Portion 1 is charged into a polymerization vessel equipped with a stirrer and a reflux condenser, and heated to its reflux temperature which is about 120° C. Portion 2 is then slowly added over a one hour period while maintaining the reaction mixture and its reflux temperature which is about 125° C. Portion 3 is then slowly added over a one hour period while the reaction mixture is maintained at reflux temperature. The reaction mixture is held at reflux temperature for an additional 1½ hours and Portions 4 and 5 are then added.

The resulting polymer has an acid number of 135. The polymer solution has a polymer solids content of 48.8% and a Gardner Holdt viscosity of 25° C. of $Z_1$.

A graft copolymer is then prepared from the above prepolymer composition by reaction of the following ingredients:

| | Parts by weight |
|---|---|
| Portion 1: | |
| Prepolymer solution prepared above (48.8% solids) | 411.0 |
| Xylene | 50.0 |
| Cellosolve | 100.0 |
| Cellosolve acetate | 217.0 |
| Portion 2: | |
| Triethylamine | 10.0 |
| Portion 3: | |
| 2-(1-aziridinyl) ethyl methacrylate | 7.0 |
| Methyl methacrylate | 750.0 |
| Acrylonitrile | 43.0 |
| Portion 4: | |
| Acetone | 230.0 |
| Portion 5: | |
| Azobisisobutyronitrile | 3.5 |
| Portion 6: | |
| Azobisisobutyronitrile | 1.5 |
| Solvent mixture of V.M. and P-Naphtha/mineral spirits/isopropyl alcohol (weight ratio of 66/28.4/5.6) | 150.0 |
| Portion 7: | |
| Azobisisobutyronitrile | 1.5 |
| Solvent mixture (described above) | 100.0 |
| Portion 8: | |
| Azobisisobutyronitrile | 1.5 |
| Solvent mixture (described above) | 100.0 |
| Portion 9: | |
| Azobisisobutyronitrile | 1.0 |
| Solvent mixture (described above) | 100.0 |
| Portion 10: | |
| Solvent mixture (described above) | 1065.0 |
| Total | 3342.0 |

Portion 1 is charged into a reaction vessel equipped with a stirrer and a reflux condenser. Portion 2 is then added and thoroughly mixed. Portion 3 is added and the reaction mixture is heated to its reflux temperature which is about 105° C. and held at this temperature for 1½ hours. Portion 4 is then added which cools the reaction mixture to about 80° C. Portion 5 is then added and the reaction is held at about 80° C. for about 1 hour. Portion 6 is added and the reaction mixture is held at about 80° C. for an additional hour. Portion 7 is added and the reaction mixture is held at 80° C. for 45 minutes. Portion 8 is then added and the reaction mixture is held at 80° C. for an additional 45 minutes. Portion 9 is then added and the reaction mixture is held at 80° C. for an additional ½ hour. Portion 10 is then added.

The resulting product is an organosol having a polymer solids content of 29.1% and a Gardner Holdt viscosity at 25° C. of about J. The polymer has an acid number of 24.4.

A mill base is prepared by blending the following ingredients:

| | Parts by weight |
|---|---|
| Portion 1: | |
| Organosol (prepared above) | 50 |
| Ethylene glycol diacetate | 21 |
| Cellosolve acetate | 15 |
| Xylene | 69 |
| Portion 2: | |
| Titanium dioxide pigment (Rutile pigment) | 347 |
| Xylene | 60 |
| Total | 562 |

Portion 1 is charged into a mixer and is thoroughly blended. Portion 2 is then added and the mixture is thoroughly blended for 30 minutes. The mixture is then charged into a conventional sand mill and ground to a 0.1 mil fineness.

An organosol lacquer is prepared by blending the following ingredients:

| | Parts by weight |
|---|---|
| Mill base (prepared above) | 230 |
| Polymer dispersion (prepared above) | 130 |
| V. M. / P-naphtha | 72 |
| Total | 432 |

This organosol lacquer is diluted to a Zahn cup viscosity of 40 seconds at 25° C. by blending the following ingredients: about 100 parts of the above lacquer are blended with 41 parts of the following solvent blend:

| | Percent |
|---|---|
| Butyl cellosolve acetate | 54.40 |
| Ethylene glycol diacetate | 8.24 |
| Butylbenzyl phthalate | 1.09 |
| V.M. & P-naphtha | 36.27 |

The above diluted organosol lacquer is sprayed onto a steel panel primed with a high pigment volume primer surfacer which has been sanded to a smooth surface. The panel is baked at 165° C. for about 30 minutes. The resulting coating is about 2.5 mils thick. The film has an excellent gloss and appearance. A second coat is applied and baked as above. Two coats adequately cover the panel and the resulting panel has an excellent gloss and appearance, excellent solvent resistance, particularly to gasoline, and has excellent water spot resistance and craze resistance. A two-coat system of this composition can be utilized as a topcoat for automobiles and trucks.

What is claimed is:

1. A graft copolymer having a number average molecular weight of about 5,000–200,000 and consists essentially of a polymeric backbone segment and polymeric side chain segments; wherein
   (1) the polymeric backbone segment comprises 10–90% by weight of the graft copolymer and consists essentially of polymerized ethylenically unsaturated monomer units selected from the group consisting of ethylene, propylene, butylene, ethylene/vinyl acetate, vinyl chloride, vinylidene chloride, tetrafluoroethylene, fluorinated ethylenepropylene, styrene, styrene/butadiene, acrylonitrile, methacrylonitrile, acrylamide and alkyl esters of acrylic and methacrylic acid in which the alkyl group has 1–24 carbon atoms; and
   (2) the polymeric side chain segments correspondingly compirse 90–10% by weight of the graft copolymer and are grafted into the backbone segment through a coupling unit that is polymerized into the backbone that has the formula

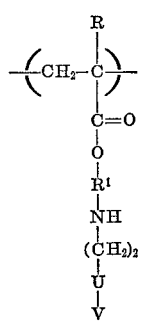

wherein R is selected from the group consisting of H and $CH_3$; $R^1$ is an alkylene group of 1–8 carbon atoms; U is a segment selected from the group consisting of

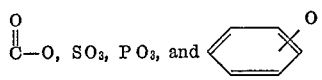

and V is a polymer segment having a number average molecular weight of about 1000–150,000 and is selected from the group consisting of epoxy hydroxy polyether ester, polyacrylic ester, polynitrile, polyamide, polyimide, polyamide/imide, polyurethane, polyester, an alkyd resin and polysiloxane.

2. The graft copolymer of claim 1 having a number average molecular weight of 20,000–200,000 and wherein
   (1) the polymeric backbone segment comprises 10–50% by weight of the copolymer and consists essentially of polymerized soft monomer units selected from the group consisting of an alkyl acrylate, alkyl methacrylate and mixtures thereof in which the alkyl groups have 4–24 carbon atoms; and
   (2) the polymeric side chain segments comprise 90–50% by weight of the graft copolymer where U is

V is a hard polymer segment having a number average molecular weight of 5000 to 150,000 and consists essentially of polymerized units selected from the group consisting of an alkyl acrylate, and alkyl methacrylate in which the alkyl groups have 1–3 carbon atoms, acrylonitrile, methacrylonitrile and mixtures thereof.

3. The graft copolymer of claim 2 having a number average molecular weight of about 30,000 to 130,000 and the backbone segment comprises 15–25% by weight of the copolymer and the side chain segment has a number average molecular weight of 20,000–100,000 and correspondingly comprises 75–80% by weight of the copolymer.

4. The graft copolymer of claim 3 in which R is $CH_3$ and $R^1$ is an alkylene group having 2 carbon atoms.

5. The graft copolymer of claim 4 in which the soft backbone segment has a glass transition temperature of about 20 to −100° C. and the hard side chain segment has a glass transition temperature of about 60 to 110° C.

6. The graft copolymer of claim 5 in which the backbone segment is selected from the group consisting of an alkyl acrylate, an alkyl methacrylate and mixtures thereof having 4–12 carbon atoms, in the alkyl groups and the side chain segment is selected from the group consisting of methyl methacrylate, acrylonitrile, methacrylonitrile and mixtures thereof.

7. The graft copolymer of claim 5 in which the backbone segment of the copolymer consists essentially of 2-ethylhexyl acrylate and the side chain segment consists essentially of methyl methacrylate.

8. The graft copolymer of claim 4 in which the backbone segment consists essentially of 2-ethylhexyl acrylate and the side chain segment consists essentially of methyl methacrylate.

9. The graft copolymer of claim 4 in which the backbone segment consists essentially of lauryl methacrylate and the side chain segment consists essentially of methyl methacrylate.

10. A graft copolymer having a number average molecular weight of about 20,000–200,000 and consisting essentially of a polymeric backbone segment and polymeric side segments; wherein
   (1) the polymeric backbone segment of the copolymer has a glass transition temperature of at least 60° C. and comprises about 95–70% by weight of the copolymer and consists essentially of polymerized units selected from the group consisting of alkyl methacrylate, alkyl acrylate, acrylonitrile, methacrylonitrile, styrene, and mixtures thereof wherein the alkyl groups have 1–4 carbon atoms; and,
   (2) the polymeric side chain segments of the copolymer have a glass transition temperature below 20° C. and comprise about 5–30% by weight of the copolymer and are grafted into the backbone segment through a coupling unit that is polymerized into the backbone that has the formula

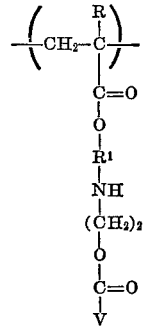

wherein R is selected from the group consisting of H and $CH_3$; $R^1$ is an alkylene group of 1–8 carbon atoms and V is a polymer segment chemically different from the backbone segment having a molecular weight of about 1000 to 15,000 and consists essentially of polymerized units selected from the group consisting of an alkyl acrylate, an alkyl methacrylate and a mixture thereof having 2–24 carbon atoms, in each of the alkyl groups.

11. The graft copolymer of claim 10 in which the graft copolymer has a molecular weight of 30,000–100,000 and has 80–92% by weight of backbone segment having a glass transition of 60 to 110° C. and correspondingly, 20–8% by weight of side chain segments having a glass transition temperature of 20 to −100° C.

12. The graft copolymer of claim 11 in which R is CH$_3$ and R$^1$ is a 2-carbon atom alkylene group and the alkyl groups of the side chain segments have 2–12 carbon atoms.

13. The graft copolymer of claim 12 in which the backbone consists of polymerized monomer units selected from the group consisting of methyl methacrylate, acrylonitrile, methacrylonitrile and mixtures thereof and the side chain consists of polymerized monomer selected from the group consisting of alkyl methacrylate, alkyl acrylate and mixtures thereof in which the alkyl groups have 2–12 carbon atoms.

14. The graft copolymer of claim 13 in which the backbone consists essentially of methyl methacrylate.

15. The graft copolymer of claim 13 in which the backbone consists essentially of methyl methacrylate and acrylonitrile and the side chain consists essentially of lauryl methacrylate.

16. The graft copolymer of claim 13 in which the backbone consists essentially of methacrylonitrile and the side chain consists essentially of lauryl methacrylate.

17. The graft copolymer of claim 13 in which the backbone consists essentially of methyl methacrylate and acrylonitrile and the side chain consists essentially of 2-ethylhexyl acrylate and lauryl methacrylate.

18. A graft copolymer having a number average molecular weight of 20,000–200,000 and consisting of a polymeric backbone segment and polymeric side chain segments; wherein (1) the backbone segment comprises 70–95% by weight of the copolymer and consists essentially of polymerized monomer units selected from the group consisting of methyl methacrylate, butyl methacrylate, acrylonitrile and mixtures thereof, and correspondingly, (2) the polymeric side chain segments comprise 30–5% by weight of the copolymer and are grafted into the backbone segment through a coupling unit that is polymerized into the backbone that has the formula

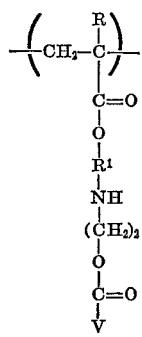

wherein R is selected from the group consisting of H and CH$_3$; R$^1$ is an alkylene group of 1–8 carbon atoms and V is a polymer segment having a number average molecular weight of 3,000–15,000 and consists essentially of 30–70% by weight, based on the weight of the polymeric side chain segments, of polymerized units of an α,β-ethylenically unsaturated carboxylic acid, and correspondingly, 70–30% by weight, based on the weight of the polymeric side chain segment of polymerized units selected from the group consisting of alkyl acrylate, alkyl methacrylate, styrene, hydroxy alkyl acrylate, hydroxy alkyl methacrylate and mixtures thereof; wherein the alkyl groups contain 1–3 carbon atoms.

19. The graft copolymer of claim 18 in which the graft copolymer has a molecular weight of about 30,000 to 100,000 and the backbone segment comprises 75–90% by weight of the copolymer and the side chain segment having a molecular weight of 5000–12,000 and correspondingly comprises 10–25% by weight of the copolymer.

20. The graft copolymer of claim 19 in which R is CH$_3$ and R$^1$ is an alkylene group having 2 carbon atoms.

21. The graft copolymer of claim 20 in which the backbone consists of methyl methacrylate.

22. The graft copolymer of claim 20 in which the side chain consists of 30–70% by weight of an acid selected from the group consisting of acrylic acid, methacrylic acid, crotonic acid, itaconic acid, and ethacrylic acid and correspondingly 70–30%, by weight of polymerized units selected from the group consisting of methyl methacrylate, butyl methacrylate and styrene.

23. The graft copolymer of claim 20 in which the backbone consists essentially of methyl methacrylate and the side chain consists essentially of 40–60% by weight, based on the weight of the side chain, of methyl methacrylate, and correspondingly, 60–40% by weight of acrylic acid.

24. The graft copolymer of claim 20 in which the backbone consists essentially of methyl methacrylate and the side chain of 40–60% by weight, based on the weight of the side chain, of methyl methacrylate and 60–40% by weight of methacrylic acid.

25. The graft copolymer of claim 20 in which the backbone of the copolymer consists essentially of butyl methacrylate and methyl methacrylate and the side chain consists essentially of 40–60% by weight, based on the weight of the side chain, of acrylic acid, and correspondingly, 60–40% by weight of methyl methacrylate.

26. A graft copolymer having a number average molecular weight of about 10,000–150,000 and consisting essentially of a polymeric backbone segment and polymeric side chain segments; wherein (1) the backbone segment comprises 10–90% by weight of the copolymer and consists essentially of polymerized monomer units selected from the group consisting of an alkyl acrylate, alkyl methacrylate, styrene and mixtures thereof in which the alkyl groups have 1–3 carbon atoms; and (2) the polymeric side chain segments comprise about 90–10% by weight of the copolymer and are grafted

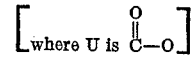

into the backbone segment through a coupling unit that is polymerized into the backbone that has the formula

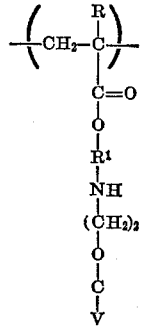

wherein R is selected from the group consisting of H and CH$_3$; R$^1$ is an alkylene group of 1–8 carbon atoms and V is a polymer segment having a molecular weight of 1,000–50,000 and consists essentially of polymerized epoxy ester units.

27. The graft copolymer of claim 26 in which the graft copolymer has a number average molecular weight of about 15,000 to 50,000 and the backbone segment comprises 40–60% by weight of the copolymer and the side chain segment having a molecular weight of 2000–20,000 correspondingly comprises 60–40% by weight of the copolymer.

28. The graft copolymer of claim 27 in which R is $CH_3$ and $R^1$ is an alkylene group having 2 carbon atoms.

29. The graft copolymer of claim 28 in which the epoxy ester is the esterification product of a dicarboxylic acid of the formula

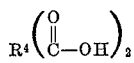

and an epoxy hydroxy polyether resin where $R^4$ is a divalent organic radical.

30. The graft copolymer of claim 29 in which the epoxy hydroxy polyether resin has the following recurring structural unit

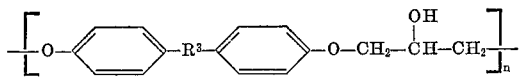

wherein $n$ is a positive integer sufficiently large to provide a molecular weight of 500–4,000 and $R^3$ is alkylene group.

31. The graft copolymer of claim 30 in which $R^3$ is selected from the group consisting of $CH_2$ and

and $R^4$ is selected from the group consisting of a divalent aromatic radical, a divalent alkylene radical having 2–15 carbon atoms and a mixture thereof.

32. A graft copolymer having a number average molecular weight of 10,000–150,000 and consisting essentially of a polymeric backbone segment and polymeric side chain segments; wherein
  (1) the backbone segment comprises 10–90% by weight of the copolymer and consists essentially of 90–70% by weight, based on the weight of the backbone segment, of polymerized monomer units selected from the group consisting of an alkyl acrylate, an alkyl methacrylate, styrene and mixtures thereof in which the alkyl groups have 1–3 carbon atoms and 10–30% by weight, based on the weight of the backbone segment, of polymerized acrylic adhesion promoting monomers selected from the group consisting of hydroxy amino alkyl methacrylate, hydroxy amino alkyl acrylate wherein the alkyl groups have 2–4 carbon atoms; 3-(2-methacryloxyethyl) - 2,2-spirocyclohexyl oxazolidine, dialkyl amino alkyl methacrylate, dialkyl amino alkyl acrylate, wherein the alkyl groups have 1–4 carbon atoms; and
  (2) the polymeric side chain segments comprise 90–10% by weight of the copolymer and are grafted into the backbone segment through a coupling unit that is polymerized into the backbone that has the formula

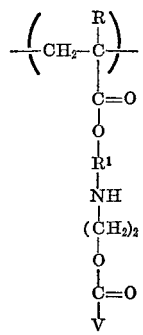

wherein R is selected from the group consisting of H and $CH_3$; $R^1$ is an alkylene group of 1–8 carbon atoms and V is a polymer segment having a molecular weight of 1,000–50,000 and consists essentially of polymerized epoxy ester units.

33. The graft copolymer of claim 32 consisting essentially of
  (1) 40–60% by weight, based on the weight of graft copolymer, of backbone segment in which the backbone segment consists essentially of 70–94% by weight methyl methacrylate and 25–5% by weight of 3-(2 - methacryloxyethyl) - 2,2 - spirocyclohexyl oxazolidine and about 1–5% by weight of t-butylamino ethyl methacrylate and correspondingly
  (2) 60–40% by weight, based on the weight of the graft copolymer, of side chain segment of an epoxy ester.

34. The graft copolymer of claim 33 in which the epoxy ester is the polymerization product of an epoxy hydroxy polyether resin and a dicarboxylic acid where the dicarboxylic acid is a blend of benzoic acid and adipic acid.

35. The graft copolymer of claim 33 in which $R^3$ of the epoxy ester is the polymerization product of an epoxy hydroxy polyether resin and a dicarboxylic acid where the dicarboxylic acid is a blend of dimer fatty acids and benzoic acid.

36. A graft copolymer having a number average molecular weight of 5,000 to 150,000 and consisting essentially of a polymeric backbone segment and polymeric side chain segments; wherein
  (1) the polymeric backbone segment comprises about 40–90% by weight of the copolymer and consists essentially of polymerized monomer units selected from the group consisting of alkyl methacrylate, alkyl acrylate, in which the alkyl groups have 1–4 carbon atoms, styrene, acrylonitrile, methacrylonitrile and mixtures thereof; and
  (2) the polymeric side chain segments comprise 10–60% by weight of the polymer and are grafted into the backbone segment through a coupling unit that is polymerized into the backbone that has the formula

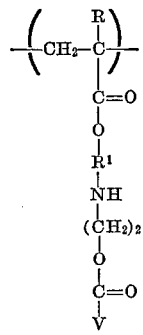

wherein R is selected from the group consisting of H and $CH_3$; $R^1$ is an alkylene group of 1–8 carbon atoms; and V is a polymer segment having a number average molecular weight of 1,000–10,000 and consists essentially of an alkyd resin.

37. The graft copolymer of claim 36 in which the graft copolymer has a number average molecular weight of about 10,000 to 50,000 and the backbone segment comprises 60–80% by weight of the graft copolymer, the side chain segment comprises 20–40% by weight of the graft copolymer and has a molecular weight of about 2,000 to 5,000.

38. The graft copolymer of claim 37 in which R is $CH_3$ and $R^1$ is an alkylene group having 2 carbon atoms.

39. The graft copolymer of claim 38 in which the acrylic backbone consists essentially of methylmethacrylate, butylmethacrylate, and the alkyd resin side chain is of linseed oil fatty acid, pentaerythritol and phthalic anhydride.

40. The graft copolymer of claim 38 in which the backbone segment is of methyl methacrylate and acrylonitrile, and the alkyd resin side chain is of coconut oil, glycerine and phthalic anhydride.

41. The graft copolymer of claim 38 in which the polymeric backbone segment is of methyl methacrylate, butyl methacrylate, hydroxy ethyl acrylate, and the alkyd resin side chain segment is of pentaerythritol, phthalic anhydride, pelargonic acid, and benzoic acid.

42. The graft copolymer of claim 38 in which the alkyd resin consists essentially of 10-60% by weight, of a fatty acid selected from the group consisting of drying oil fatty acids and non-drying oil fatty acids, 10-30% by weight of a polyhydric alcohol and 10-30% by weight of a polybasic acid or an anhydride of a polybasic acid.

43. The graft copolymer of claim 42 in which the alkyd resin consists essentially of the drying oil fatty acid selected from the group consisting of linseed oil fatty acid, tung oil fatty acid, dehydrated castor oil fatty acid, soya bean oil fatty acid and tall oil fatty acid, and the polyhydric alcohol is selected from the group consisting of glycerol, pentaerythritol, trimethylol propene, trimethylol ethane, sorbitol, mannitol and methylglucoside, hexanetriol, ethylene glycol, propylene glycol, diethylene glycol, dipropylene glycol, butanediol, pentanediol, tetramethylene glycol, neopentyl glycol, and cyclohexane dimethanol and the polybasic acid or anhydride is an aromatic polycarboxylic acid or its anhydride.

44. The graft copolymer of claim 43 in which the backbone is selected from monomer units consisting essentially of methyl methacrylate, propyl methacrylate, butyl methacrylate, styrene, acrylonitrile and methacrylonitrile.

References Cited
UNITED STATES PATENTS

| Patent | Date | Inventor | Class |
|---|---|---|---|
| 3,280,218 | 10/1966 | Endsley et al. | 260—2 |
| 3,355,437 | 11/1967 | Tesoro et al. | 260—2 |
| 2,882,259 | 4/1959 | Graham | 260—874 |
| 2,915,480 | 12/1959 | Reeves et al. | 260—2 |
| 3,232,903 | 2/1966 | Schmidle et al. | 260—33.6 |
| 3,262,991 | 7/1966 | McClendon et al. | 260—823 |
| 3,291,859 | 12/1966 | Tobolsky | 260—859 |
| 3,317,635 | 5/1967 | Osmond | 260—881 |
| 3,338,885 | 8/1967 | Coker et al. | 260—239 |
| 3,480,601 | 11/1969 | Ashby et al. | 260—86.1 |
| 3,507,814 | 4/1970 | Uelzmann | 260—2 |
| 3,511,897 | 5/1970 | Endsley | 260—878 |
| 3,573,278 | 3/1971 | Uelzmann | 260—2 |
| 3,651,005 | 3/1972 | Walus | 260—31.2 |

DONALD E. CZAJA, Primary Examiner

R. W. GRIFFIN, Assistant Examiner

U.S. Cl. X.R.

117—124 E, 132 B, 132 R, 161 K, 161 R, 161 UZ; 260—2 EN, 31.2 R, 31.2 XA, 33.6 UA, 33.6 UB, 33.6 R, 33.6 EP, 827, 837 R, 859 R, 873, 875, 882, 883, 885

PO-1050
(5/69)

UNITED STATES PATENT OFFICE
CERTIFICATE OF CORRECTION

Patent No. 3,746,673  Dated July 17, 1973

Inventor(s) John A. Simms and Aloysius N. Walus

It is certified that error appears in the above-identified patent and that said Letters Patent are hereby corrected as shown below:

Claim 1, column 37, line 30, "compirse" should read -- comprise --.

Claim 18, column 39, line 36, "consisting of a" should read -- consisting essentially of a --.

Claim 26, column 40, lines 48-49, the formula
"$\left[ \text{where U is C-O} \atop \phantom{x} \overset{O}{\|} \right]$" should be deleted entirely.

Claim 26, column 40, lines 55-67, delete the formula and insert following formula

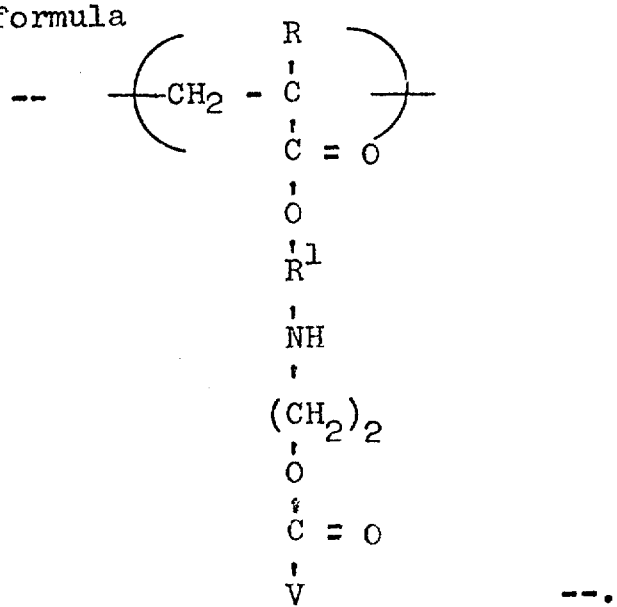

--.

Signed and sealed this 19th day of February 1974.

(SEAL)
Attest:

EDWARD M. FLETCHER, JR.
Attesting Officer

C. MARSHALL DANN
Commissioner of Patents